(12) United States Patent
Buckland et al.

(10) Patent No.: US 12,198,086 B2
(45) Date of Patent: Jan. 14, 2025

(54) ORCHARD VEHICLE AND SYSTEM

(71) Applicant: Bovi, Inc., Dover, DE (US)

(72) Inventors: Lucas Thorne Buckland, Rocklin, CA (US); Connor Quinn Buckland, Rocklin, CA (US); Kenneth Michael Buckland, Rocklin, CA (US)

(73) Assignee: BOVI, INC., Dover, DE (US)

( * ) Notice: Subject to any disclaimer, the term of this patent is extended or adjusted under 35 U.S.C. 154(b) by 232 days.

(21) Appl. No.: 17/867,263

(22) Filed: Jul. 18, 2022

(65) Prior Publication Data

US 2023/0030848 A1 Feb. 2, 2023

Related U.S. Application Data

(60) Provisional application No. 63/222,611, filed on Jul. 16, 2021, provisional application No. 63/222,604, filed on Jul. 16, 2021.

(51) Int. Cl.
*G06Q 10/0631* (2023.01)
*A01B 69/00* (2006.01)
(Continued)

(52) U.S. Cl.
CPC ..... *G06Q 10/06316* (2013.01); *A01B 69/001* (2013.01); *A01B 69/008* (2013.01); *A01B 79/005* (2013.01); *A01B 79/02* (2013.01); *A01D 46/30* (2013.01); *G06N 3/084* (2013.01); *G05D 1/0044* (2013.01); *G05D 1/0214* (2013.01); *G05D 1/0223* (2013.01)

(58) Field of Classification Search
CPC ............ G06Q 10/06316; A01B 69/001; A01B 69/008; A01B 79/005; A01B 79/02; A01D 46/30; G06N 3/084; G06N 3/092; G06N 3/006; G05D 1/0044; G05D 1/0214; G05D 1/0223
USPC .......................................................... 701/2
See application file for complete search history.

(56) References Cited

U.S. PATENT DOCUMENTS

| 10,123,473 B2 * | 11/2018 | Cavender-Bares .. A01C 21/005 |
| 2006/0213167 A1 * | 9/2006 | Koselka ................ A01D 75/00 56/10.2 A |

(Continued)

OTHER PUBLICATIONS

PCT International Search Report & Written Opinion dated Nov. 2, 2022 for PCT Application No. PCT/US22/37466.

(Continued)

*Primary Examiner* — Tyler D Paige
(74) *Attorney, Agent, or Firm* — Gates & Cooper LLP

(57) ABSTRACT

A method and system provide the ability to autonomously navigate an orchard cart in an orchard. Data is received from a sensor suite of the orchard cart into a computer. The sensor suite includes two or more sensors with at least one positional sensor and at least one perception sensor. Based on the data, the computer detects objects in the orchard. A row in the orchard consists of the objects. The orchard cart is autonomously navigated, via the computer, through the orchard. The navigation includes autonomously positioning the orchard cart a defined distance from the detected objects with respect to the row, and autonomously maintaining a defined speed of the orchard cart as the orchard cart is navigated down the row, such that the orchard cart avoids the detected object.

20 Claims, 20 Drawing Sheets

(51) Int. Cl.
  *A01B 69/04* (2006.01)
  *A01B 79/00* (2006.01)
  *A01B 79/02* (2006.01)
  *A01D 46/30* (2006.01)
  *G05D 1/00* (2024.01)
  *G06N 3/084* (2023.01)

(56) References Cited

U.S. PATENT DOCUMENTS

| | | |
|---|---|---|
| 2013/0174040 A1 | 7/2013 | Johnson |
| 2014/0030487 A1 | 1/2014 | Boyce et al. |
| 2015/0105965 A1* | 4/2015 | Blackwell ............ A01B 69/004 701/28 |
| 2015/0278933 A1 | 10/2015 | Barfield, Jr. |
| 2016/0253595 A1 | 9/2016 | Mathur et al. |
| 2017/0123424 A1* | 5/2017 | Cavender-Bares .. A01B 79/005 |
| 2017/0349196 A1 | 12/2017 | Camarco et al. |
| 2018/0092304 A1 | 4/2018 | Moore |
| 2018/0242515 A1 | 8/2018 | Yajima et al. |
| 2018/0330435 A1 | 11/2018 | Garg |
| 2019/0094857 A1 | 3/2019 | Jertberg et al. |
| 2019/0170718 A1 | 6/2019 | Miresmailli et al. |
| 2019/0261565 A1* | 8/2019 | Robertson ............ B25J 15/0019 |
| 2020/0019777 A1 | 1/2020 | Gurzoni, Jr. et al. |
| 2020/0132651 A1 | 4/2020 | McPeek |
| 2020/0281122 A1* | 9/2020 | Mor ........................ A01F 15/00 |
| 2021/0000006 A1 | 1/2021 | Ellaboudy et al. |
| 2021/0000013 A1* | 1/2021 | Robertson .............. A01D 46/28 |
| 2021/0073692 A1 | 3/2021 | Saha et al. |
| 2022/0004175 A1 | 1/2022 | Jordan et al. |
| 2022/0187847 A1 | 6/2022 | Cella et al. |

OTHER PUBLICATIONS

Wang, Q., et al., "Automated Crop Yield Estimation for Apple Orchards", In Proc. International Symposium on Experimental Robotics, Jun. 2012, Quebec City, pp. 1-15.

PCT International Search Report & Written Opinion dated Nov. 23, 2022 for PCT Application No. PCT/US22/37470.

Non-Final Office Action dated Apr. 8, 2024 for U.S. Appl. No. 17/867,307.

Final Office Action dated Oct. 23, 2024 for U.S. Appl. No. 17/867,307.

* cited by examiner

ORCHARD VEHICLE AND SYSTEM

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

U.S. Patent Application Ser. No. 63/222,604, filed on Jul. 16, 2021, with inventor(s) Lucas Thorne Buckland, Connor Quinn Buckland, and Kenneth Michael Buckland, entitled "Orchard Cart and System," and U.S. Patent Application Ser. No. 63/222,611, filed on Jul. 16, 2021, with inventor(s) Lucas Thorne Buckland and Connor Quinn Buckland, entitled "Swarm Based Orchard Management", and This application is related to the following co-pending and commonly-assigned patent application, which application is incorporated by reference herein:

U.S. patent application Ser. No. 17/867,307, filed on the same date herewith, with inventor(s) Lucas Thorne Buckland and Connor Quinn Buckland, entitled "Swarm Based Orchard Management", which application claims priority to U.S. Patent Application Ser. No. 63/222,611, filed on Jul. 16, 2021, with inventor(s) Lucas Thorne Buckland and Connor Quinn Buckland, entitled "Swarm Based Orchard Management", and U.S. Patent Application Ser. No. 63/222,604, filed on Jul. 16, 2021, with inventor(s) Lucas Thorne Buckland, Connor Quinn Buckland, and Kenneth Michael Buckland, entitled "Orchard Cart and System," which applications are incorporated by reference herein.

BACKGROUND OF THE INVENTION

1. Field of the Invention

The present invention relates generally to orchard management, and in particular, to a method, apparatus, and system for managing an orchard using a robotic orchard vehicle and system.

2. Description of the Related Art

There is a significant labor shortage in the orchard fruit industry. Prior art systems had attempted to address such a labor shortage using manual methods where human workers manually move carts and/or carry containers through an orchard. Such a method and system is inefficient and fails to address the labor shortage. Accordingly, what is needed is a method and system that improves human efficiency in the management and maintenance of an orchard.

SUMMARY OF THE INVENTION

Embodiments of the invention overcome the problems of the prior art by utilizing robotics. More specifically, prior art tasks that were overly time consuming or strenuous are performed utilizing a robotic system referred to as a "cart".

Embodiments of the invention provide a novel robotic cart structure as well as a new method and system for controlling individual actions of the cart and numerous carts throughout an orchard.

Embodiments of the invention further describe an orchard cart and fruit management system. The orchard cart includes a powertrain, a detachable transport structure, a frame, a sensor suite, and a computer.

The powertrain transports the orchard cart and supports off-road movement of the orchard cart. The powertrain may include a pivot arm for each wheel of the orchard cart. Such a pivot arm may include a mechanism to rotate each wheel.

The detachable transport structure holds organic material from an orchard and is detachable from a load platform. A housing may also hold a second detachable transport structure.

The frame is attached to the powertrain. Further, the frame includes the load platform that supports a load that exceeds five hundred (500) pounds. In one or more embodiments, one or more components of the frame adjust a vertical position of the detachable transport structure that is attached to the load platform. In one or more embodiments, the frame may also have multiple mounting points for attaching additional components to the orchard cart. In such an embodiment, the frame may have power rails to supply power to the additional components.

The sensor suite includes two or more sensors including at least one positional sensor and at least one perception sensor. The computer autonomously controls transportation of the orchard cart based on data received from the sensor suite. Further, the computer autonomously navigates the orchard cart through the orchard. In addition, the orchard cart may not have a cab for a human driver.

The orchard cart may further include a portable temperature control unit attached to the frame which is used to maintain the ambient temperature of organic material (fruit) in the orchard or in the detachable transport structure.

The orchard cart may further include a hydraulic coupler that outputs hydraulic power to additional hydraulic components. With respect to the dimensions of the orchard cart, in one or more embodiments, a total overall height of the orchard cart may be lower than a lowest branch of a harvest ready semi-dwarf fruit tree.

The orchard cart may also include a scale and a picker identification system. In such an embodiment, the computer may compute, based on a weight measured by the scale and the picker identification system, an organic material (e.g., fruit) quantity for a specific picker.

In one or more embodiments, a camera may capture one or more images of the organic material (e.g., fruit) in the detachable transport structure, and the computer may compute, based on the one or more images, a quality of the organic material (e.g., fruit) in the detachable transport structure.

In one or more embodiments, the orchard cart further includes a mechanical movement system and a storage area. In such embodiments, the detachable transport structure includes one or more totes and the mechanical movement system is configured to move the one or more totes to, from, and around the storage area. In additional embodiments, the cart may include an elevator that holds the one or more totes at a specified height. Alternatively, or in addition, the orchard cart may include one or more liftable trays for loading and unloading the one or more totes. The computer may control the mechanical movement system by: (1) moving one or more empty totes of the one or more totes from a first location on the load platform to a second location, wherein the second location is in the storage area; (2) moving a first empty tote from the second location to a third location for filling; (3) waiting for the first empty tote to be removed and returned full of organic material thereby becoming a first full tote; (4) moving the first full tote from the second location to the first location; and (5) repeating steps (2)-(4). In embodiments, the computer may further detect that the third location is occupied by a full tote or an empty tote. If the third location contains an empty tote, the computer moves the empty tote to the second location. If the third location contains a full tote, the computer moves the full tote to the first location on the loading platform. In embodiments of the invention, the third location may be located at a chest level location of the orchard cart or on an elevated platform of the orchard cart.

In one or more embodiments, the computer may receive a location in the orchard from a wireless device, and then navigate the orchard cart to the location.

The orchard cart and system may also include a safety system that has multiple redundant layers for safely operating the orchard cart. The multiple redundant layers may include an emergency stop layer that cuts power to the orchard cart, a software stop layer that halts all operation of the orchard cart without cutting power, a safety layer that constrains operations of the orchard chart based on defined safety conditions, an object detection layer that uses the data from the sensor suite to avoid collision of the orchard cart with obstacles, a close proximity detection layer that disallows operation of the orchard cart if humans are within touching distance of the cart, a human avoidance layer that uses location information for humans in the orchard to avoid collision of the orchard cart with the humans, and/or a boundary limitation layer that avoids navigation of the orchard cart outside of a boundary of the orchard based on geofencing. In such a safety system, the software stop layer may further include an electrical voltage applied to the orchard cart. The computer may be capable of detecting when the voltage has dropped due to grounding and thereby determine that the detection is a result of a human interacting with the orchard cart. Based on such a detection/determination, the computer may halt all operation of the orchard cart.

The computer may perform the autonomous navigation by detecting human locations in the orchard, grouping the human locations into one or more groups based on distances between the human locations, assigning the orchard cart to one of the one or more groups, determining (based on the assigning) an optimal location for the orchard cart (wherein the optimal location comprises a minimum distance to the assigned group), and autonomously navigating the orchard cart to the optimal location. In such an embodiment, the computer may communicate with at least one other orchard cart, the grouping may consist of two or more groups, and the computer coordinates with the at least one other orchard cart to determine the optimal location for all of the orchard carts by minimizing distance from each of the orchard carts to assigned groups. Further, the computer may autonomously control transportation of the orchard cart to follow the group the orchard cart is assigned to as the group moves in the orchard. In addition, the detection of the human locations may include: recording, in a smart application, a global positioning system (GPS) location on a cellular device carried by each human; the smart application transmitting the GPS location to a server application on a server executing in a cloud computing environment; a cart application executing on the computer on the orchard cart transmitting a cart location to the server application; the server application determining a destination for the orchard cart based on the GPS location and the cart location; the server application transmitting the destination to the orchard cart; and the computer controlling transportation of the orchard cart based on the destination.

In one or more embodiments, the computer may autonomously navigate the orchard cart by: detecting an object (e.g., a plant) using the sensor suite, wherein a row in the orchard comprises multiple objects; positioning the orchard cart a defined distance from the detected plant with respect to the row; and maintaining a defined speed of the orchard cart as the orchard cart is navigated down the row.

As described above, the orchard cart frame may also include a standing platform for a picker to stand on thereby increasing a height with which the picker picks organic material from a tree. Such a standing platform may also include static railing, wherein the static railing supports a load force from a picker leaning against the railing. In additional embodiments, the standing platform may include physical steps on top of the standing platform to further increase the height, a mechanical lift to further increase the height, a mechanical ladder to further increase the height, and/or a harness system for safety of the picker.

In one or more embodiments, the computer may further: record telemetry data, wherein the telemetry data comprises a cart state of the orchard cart; transmit the telemetry data to a cloud based server; and the cloud based server receives the telemetry data and generates a visualization of the orchard. Such a visualization may include the cart state of the orchard cart and a plant state for plants in the orchard. Alternatively, or in addition, the visualization may include a picker state for pickers in the orchard. Further, the visualization may be interactive such that selection of the cart state or plant state provides additional information. The visualization may also be utilized to graphically move a representation of the orchard cart within the visualization to a different location within the orchard, and based on the move, transmit a command to the computer that navigates the orchard cart to the different location. Alternatively, or in addition, the visualization may be utilized to transmit a command to the computer to control the cart state.

Embodiments may also include a network interface on the computer. Such a network interface may communicate with a mesh network comprised of a set of orchard carts. The mesh network enables communication between a server and any of the orchard carts in the set of orchard carts. In one or more embodiments, the network interface may enable communication amongst the orchard carts in the set of orchard carts, and/or enable signal strength based triangulation for localization of any of the orchard carts in the set of orchard carts.

Further to the orchard cart described herein, embodiments of the invention may provide for a fruit management system that includes a fruit transport tube, a chute, a padded wall, a fruit gate, a fruit placement structure, sensors, a fruit management arm, and a computer.

The fruit transport tube receives fruit. The chute is coupled to the transport tube and receives the fruit from the fruit transport tube. The padded wall is positioned inside the chute to dampen an impact of the fruit received from the fruit transport tube. The fruit gate rotates around the chute and opens to allow fruit to exit the chute. The fruit placement structure is angled and enables the fruit to travel from an opening of the fruit gate into a fruit bin. The one or more sensors are located under the fruit placement structure and detect a location of fruit in the fruit bin. The fruit management arm moves the fruit management system within the fruit bin. A computer may control, based on the location of the fruit in the fruit bin: the fruit gate rotation; opening, and closing of the fruit gate; and the fruit management arm.

Alternatively, or in addition to the above, embodiments of the invention may provide a fruit management tube. The tube may include an entry nozzle that receives fruit, a tube with a first end of the tube coupled to the entry nozzle, and a second end that allows the fruit to exit into a fruit receiving apparatus, and one or more pressure injectors placed along a length of the tube, wherein the pressure injectors inject air pressure into the tube to move fruit in the tube towards the second end. The fruit management tube may also include one or more inertial measurement units (IMUs) that measure an angle of the tube, a notification unit that produces a signal, and a computer that communicates with the IMUs, determines that the angle of the tube requires adjustment, and activates the notification unit.

BRIEF DESCRIPTION OF THE DRAWINGS

Referring now to the drawings in which like reference numbers represent corresponding parts throughout.

DETAILED DESCRIPTION OF THE INVENTION

Figure 1:
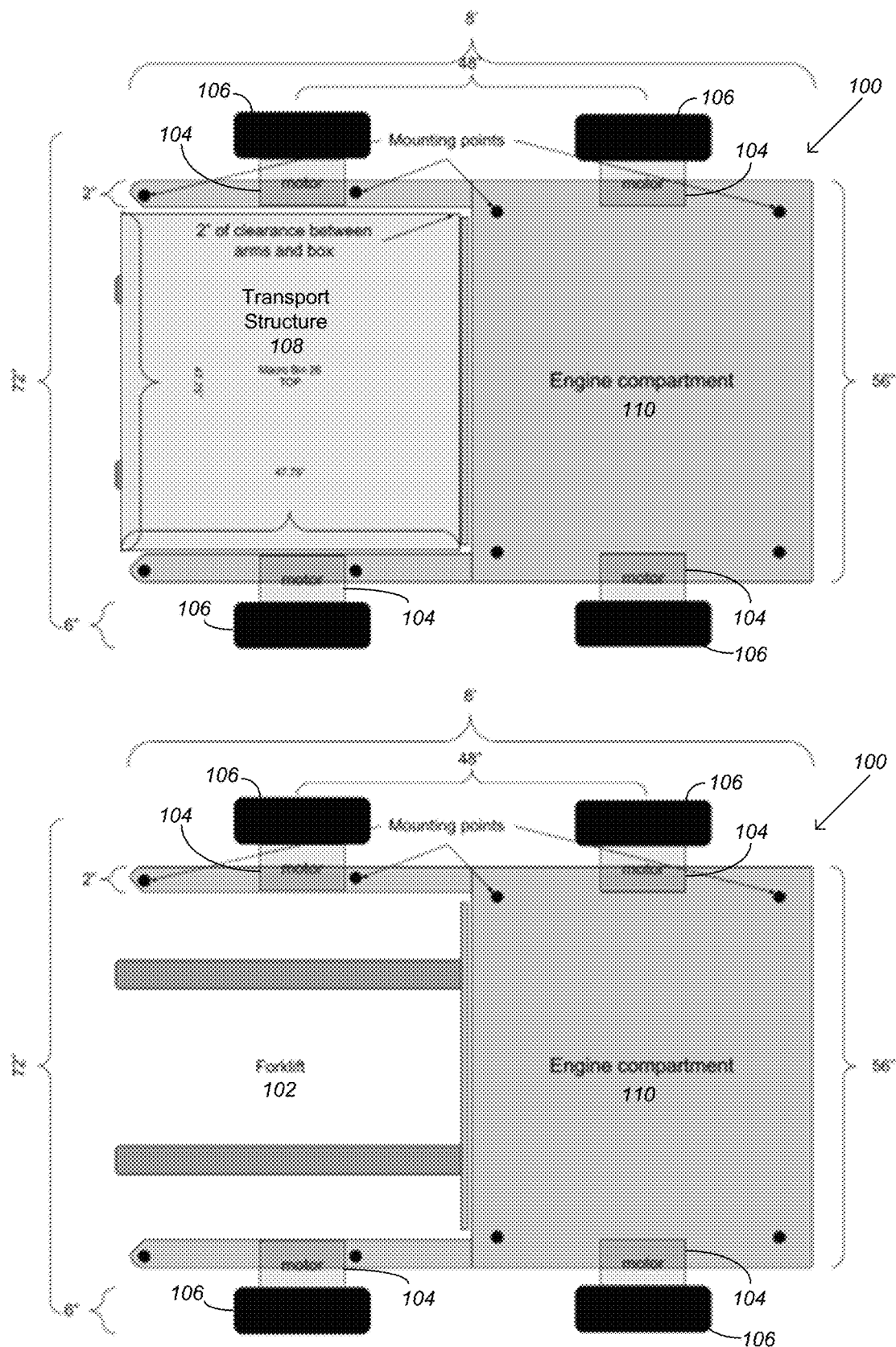
FIG. 1 illustrates a high level diagram of a top view of a cart/cart base designed in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Terminology

Row: A line of trees, spaced at even intervals in two (2) dimensions.

Aisle: A pathway parallel to and between two rows, between which tractors and other vehicles traditionally travel.

Practices: Various modes of interaction between a Worker or cart and trees within an orchard, which may include pruning, thinning, harvesting, etc.

Bin: An enclosure used to transport fruit, nuts, or other items within an orchard.

Totes: A smaller enclosure to transport fruit or nuts within an orchard.

Picker: A human harvester of fruit.

Logistics yard: A large hub, which may include the long-term storage of bins, the active use of forklifts, and the active use of long-distance haulage trucks.

Staging Area: A small hub, which may contain a small number of carts or bins, generally associated with one end of a row or column.

Mesh Network: A series of peer-to-peer wireless connections between carts, and between carts and permanent network nodes, which allows for communication between 2 individual carts, and between an individual cart and the internet.

Orchard Cart/Vehicle: A vehicle (e.g., a drone, cart, boat, etc.) that has various features and capabilities to move throughout an orchard autonomously in a manner that optimizes/increases efficiency for orchard workers and the transport of fruits/nuts/vegetables (or other organize materials) to, from, and around an orchard.

Overview

Embodiments of the invention provide a cart that is composed of several major system components.

The first system component is the cart base. The cart base is the platform on which the other subsystems are built; it provides autonomous and manual locomotion, mounting points, power, hydraulics, connectivity, and other capabilities necessary to support the larger system.

The second component is the fruit tree accessibility system. The fruit tree accessibility system is designed to alleviate the use of manual ladders by allowing workers to get to hard to reach places through alternative methods.

The third component is the fruit management system. The fruit management system is designed to transport fruit directly from the harvester to a fruit storage receptacle on the cart while introducing minimal, or no, bruising.

The fourth component is the cart fleet management system. The cart fleet management system is a cloud based system designed to allow monitoring, diagnosis, logging and optimal organization and control of a fleet of carts to effectively address the immediate needs of an orchard.

Cart Base

The Cart base is the platform on which the other subsystems are built. It can be described in two major parts: the hardware and the software.

Hardware

Cart Base

Figure 2:
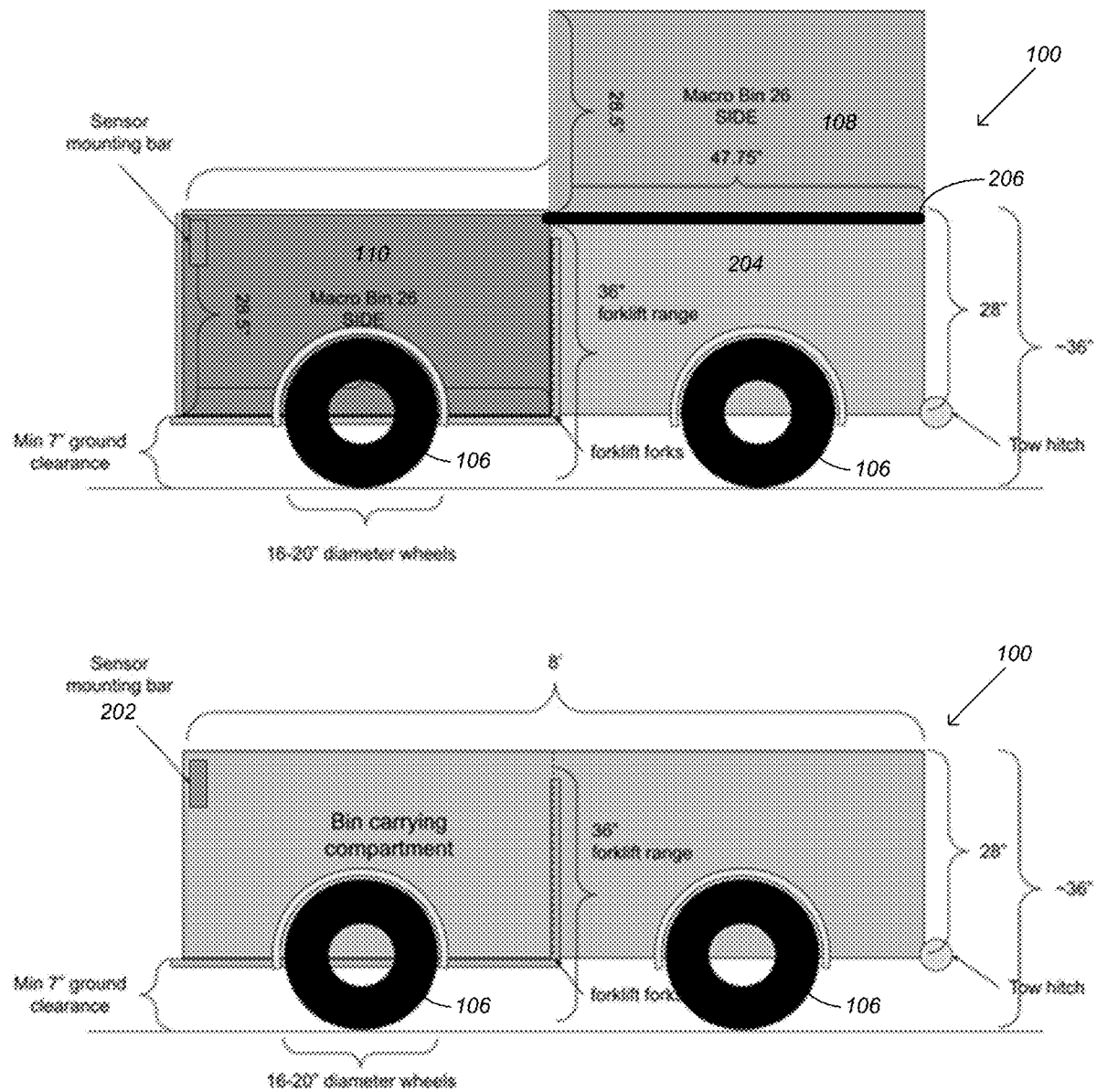
FIG. 2 illustrates a high level diagram of a side view of a cart/cart base designed in accordance with one or more embodiments of the invention.

On the hardware side, the cart is designed to be simple, cost effective, and to use off the shelf components. The overall price-point is low, so that it's cost effective for the farmer to acquire and maintain multiple carts. The form factor is compact so that it can navigate orchards and vineyards of different sizes, and the base is short so that it can squeeze under trees. FIG. 1 illustrates a high level diagram of a top view of a cart/cart base designed in accordance with one or more embodiments of the invention. FIG. 2 illustrates a high level diagram of a side view of a cart/cart base designed in accordance with one or more embodiments of the invention. As illustrated, embodiments of the cart base may comprise a forklift 102 design that is extensible, has the ability to carry heavy loads, is low profile, is built for autonomy, and may be driven off-road and on-road.

As shown in FIG. 1, there are four motors 104 independently driving four wheels 106. These motors 104 can be electric or hydraulic, depending on the application and power source. The energy to drive the cart 100 is supplied by an engine driven generator, automotive grade EV batteries, or by a hybrid of both. At the front of the cart 100 there is a low profile hydraulically actuated forklift 102, to allow the pickup and drop-off of standard bin sizes used for transporting orchard fruit, as well as pallets stacked with totes. The detachable transport structure 108 that can be carried in this forklift 102 can transport rocks, branches, produce, tools, materials, or other heavy items. The motors 104, engine (i.e., within engine compartment 110), generator, wheels 106 and other components shown will all use easily obtainable off the shelf parts, making repairs straightforward. The chassis of cart 100 may consist of a custom, heavy steel frame, highly robust to wear and tear. The ground clearance of the cart 100 is intentionally high, to allow navigation through ruts in an orchard lane, and through mud. The forklift 102 has predefined heights which lifts its contents to heights appropriate for placing fruit in the bin/detachable transport structure 108, or driving with the bin, or picking up or dropping a bin.

Figure 7:
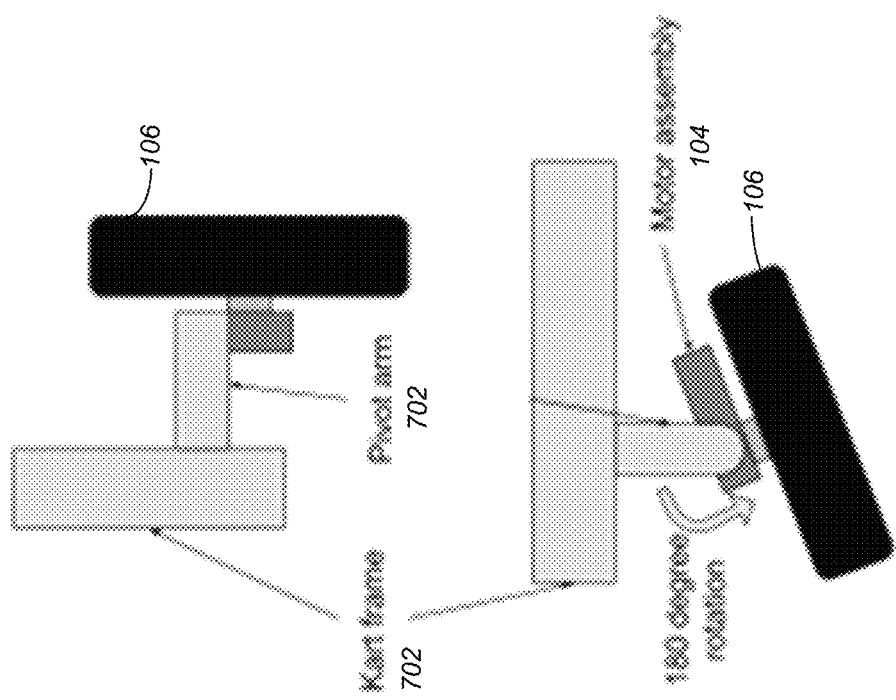
FIG. 7 illustrates rotating wheels on a cart design in accordance with one or more embodiments of the invention.

The four fixed wheels 106 of the cart 100 are designed to allow "skid steering." Additionally, the heavy components are placed purposefully to give the cart 100 a low center of mass towards the center of the wheelbase, to avoid tipping of the cart 100 when equipment is mounted to it. In other models, the wheels 106 are able to rotate 180 degrees on the vertical axis. See FIG. 7 below for a visual description of such an implementation. Such an implementation/configuration allows the cart 100 to move freely in any direction without having to turn the chassis. Other versions of the cart 100 may include auto leveling, and hydraulic suspension, to allow pickers and cargo (fruit) smooth transport around the orchard.

Figure 3:
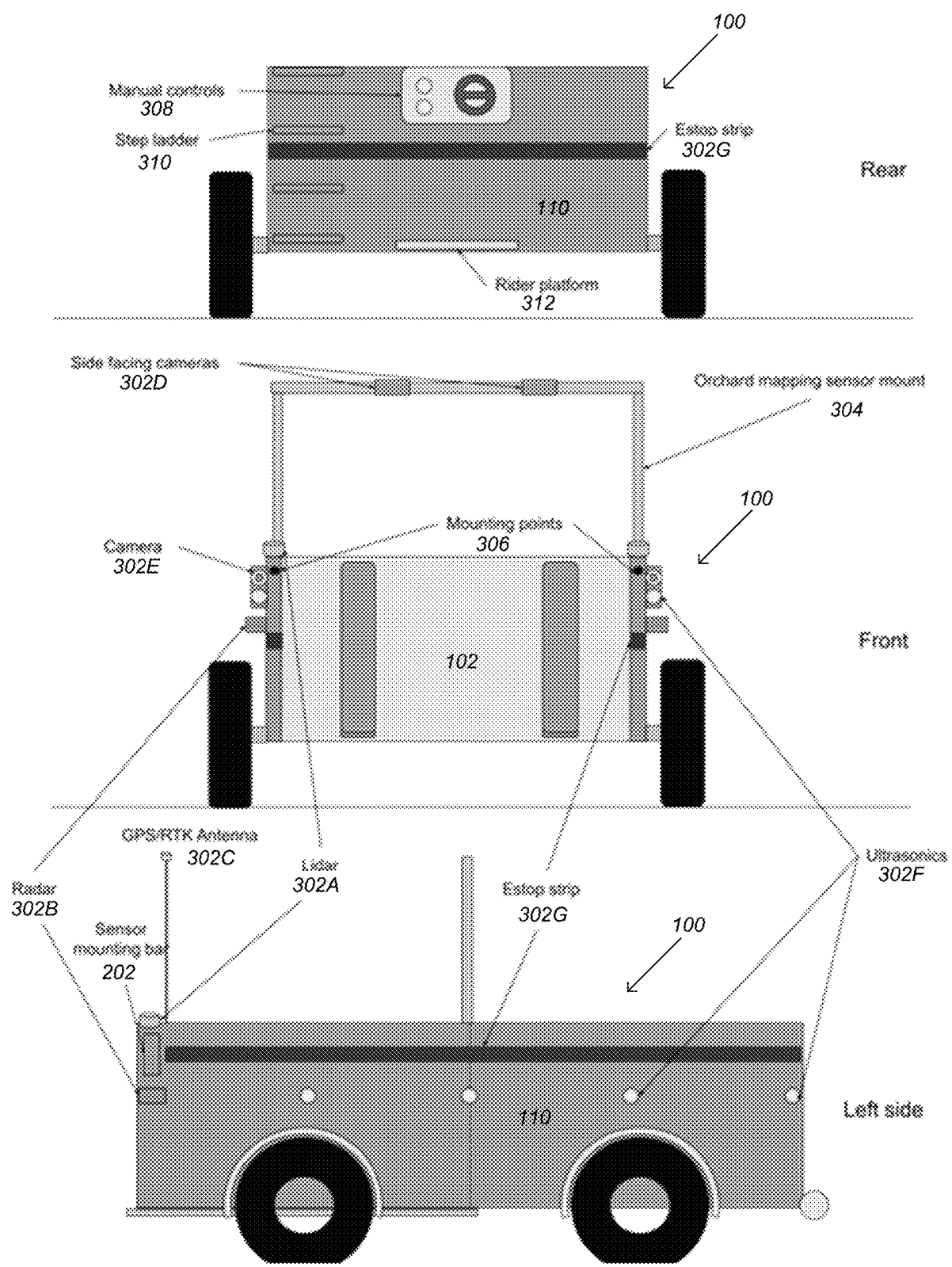
FIG. 3 shows tentative placements for sensors needed to drive a cart autonomously in accordance with one or more embodiments of the invention.

FIG. 3 shows tentative placements for sensors needed to drive the cart 100 autonomously, though these will be adjusted to suit different applications. The sensor suite will utilize a subset of the following, aiming for simple, robust, low cost sensors where possible. These sensors will be mounted at strategic positions around the cart 100 to give a clear view of the surroundings and not be blocked by workers, foliage or other obstructions. Sensors may include at least one or more of the following:

- Lidar 302A
- Radar 302B
- RTK (real-time kinematic positioning)/GNSS GPS (Global Navigation Satellite System-Global Positioning System) Antenna 302C
- IMU (inertial measurement unit)
- Stereo cameras 302D and 302E
- Infrared cameras 302D and 302E
- Hyperspectral cameras 302D and 302E (i.e., cameras 302D and 302E may be stereo, infrared, hyperspectral, etc.)
- Ultrasonics 302F
- Environmental sensors; temperature, humidity, etc. (i.e., Estop strip 302G)
- Weight sensors on the forklift; to determine bin fill level FIG. 3 also shows the frame 304 that is used to facilitate side mounted cameras 302D and other sensors 302A-302F (e.g., mounted to orchard mapping sensor mount 304) used to map the orchard. These side-mounted cameras 302D would be used to monitor the day to day production of the orchard and make an estimate of fruit distribution and yield before harvest day. The cameras 302D and 302E mounted to this frame 304 point in either direction.

An additional aspect of the cart 100 base is that it's designed to be extensible. Mounting points 306 on top of the engine compartment box 110, as well as along the two arms 304 which surround the forklift section 102, allow the easy installation of additional hardware.

FIGS. 1 and 2 show tentative placements for these mounting points 306. These mounting points 306 are customized and suited to what is being mounted. However, the variations are bolt holes, through holes or 80/20 etc. In other cart models, power rails, as well as extra hydraulic lines, are easily accessible to additional components that are being mounted. Data cabling is easily routed through breakout boxes to the engine compartment 110 and central computers. The power system and hydraulics has extra capacity for these additional components.

Worker comfort is an extremely important aspect of the cart design. Thus, alternate versions of the cart 100 include attachments to allow for water and shade to be easily provided to the users of the cart. Another attachment allows for transporting ladders with the cart. A safety warning system may be attached to the cart 100 to notify workers when it is moving.

Keeping orchards warm in cold seasons is a big problem as frost may cause the loss of an entire crop. To avoid this, carts 100 can be fitted with large heaters, strapped to the sides, and then allowed to drive the field throughout the night, keeping the trees warm.

Figure 4:
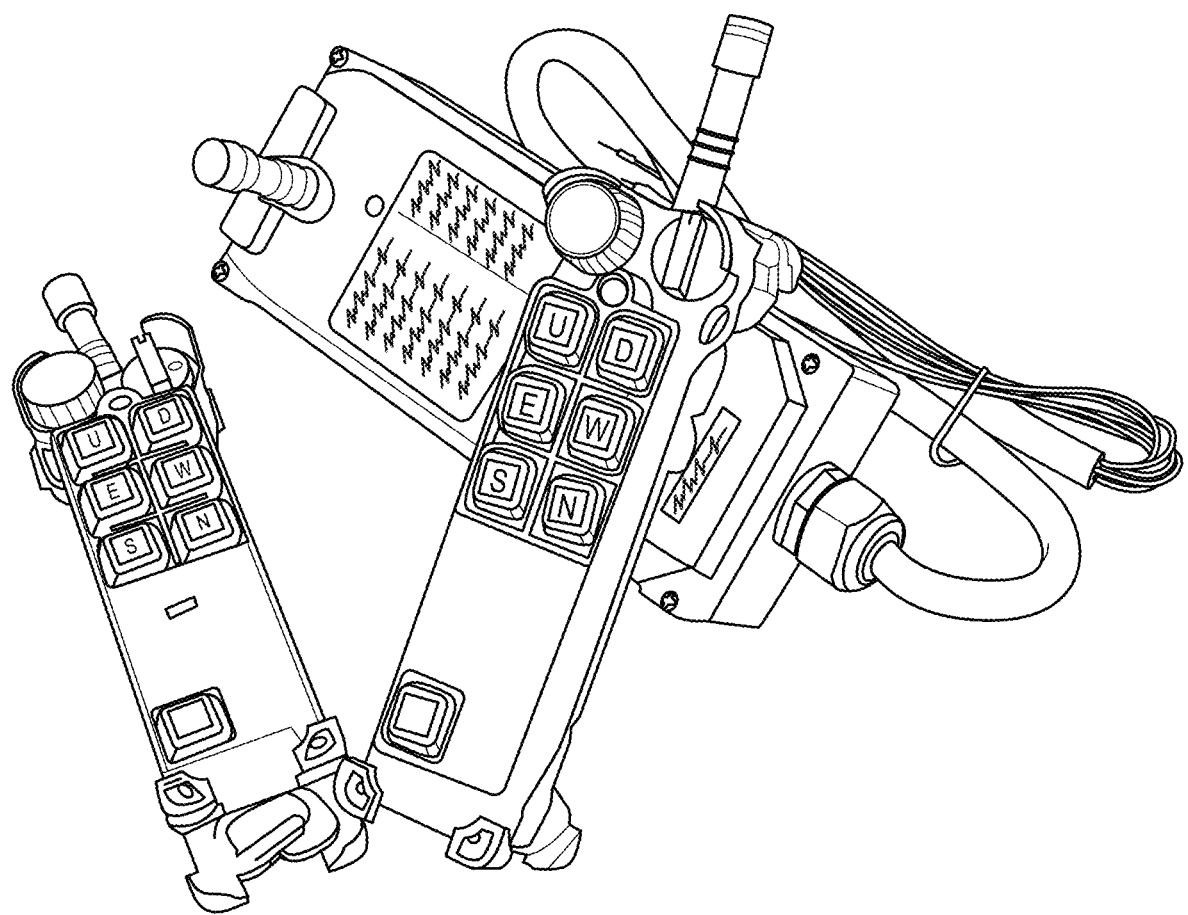
FIG. 4 illustrates a radio controller and safety system that may be utilized in accordance with one or more embodiments of the invention.

The cart 100 may include various types of wireless connectivity to support its operation. A cell modem will be installed to provide access to the internet and allow streaming of telemetry data. A radio receiver will be installed, to allow basic remote control and a fail-safe remote emergency stop; utilizing something like the system shown in FIG. 4. The cart will provide a Wi-fi hotspot for all farm workers to connect to via smartphone, to allow communication between the cart and a smartphone app. In some applications, the cart is fully controllable with a smartphone only, and need not have any other control devices, including ones located on the cart, or of the sort shown in FIG. 4. In this regard, FIG. 4 illustrates a radio controller and safety system that may be utilized in accordance with one or more embodiments of the invention. Such a radio controller and safety feature may be preferred, as people tend to keep smartphones safe, and avoid losing them, which maintains integrity of the control system.

When providing fruit tree accessibility, the cart 100 may have manual controls 308 such as a joystick mounted at operator level that will allow for direct control of the cart 100 using "resolved motion". That is, if the manual control 308/joystick is pushed in a particular direction, or turned, the cart's skid steer motors 104 will respond accordingly, providing intuitive control of the cart 100. The cart 100 may also include a step ladder 310 for a worker to climb in order to view inside of the cart bin. Alternatively, or in addition, the cart 100 may include a rider platform 312 to enable a worker to ride on the cart 100 as it navigates (and/or to manually control navigation) through an orchard.

An additional aspect of the carts' feature set is its ability to track how much fruit has been picked, and by whom. This is important because pickers may be paid by the tote, or by the bag of fruit harvested. Ensuring that pickers are properly paid, and growers are not overpaying, is a key aspect of helping to manage an orchard. To provide such capabilities, embodiments of the invention may include a picker weight tracking system in which the application of load cells in the forklift 102 are used to estimate a picker's output and quality of fruit picked. Key elements may include the application of instruments for determining weight to determine how much fruit is picked, the ability to tie fruit picked to a particular worker, and the application of sensors 302 to tie the quality of fruit picked to an individual worker and predict the quality of the yield.

To track the fruit being harvested by each individual picker, a few elements may be incorporated. As an optional add on, a farmer can purchase a wireless or bluetooth scale that can be affixed to the cart 100. Such a scale allows the picker to measure their tote or bag when they are ready to dump the contents into the bin. The weight of the fruit picked is then directly tied to how much the picker is paid. When the contents of the tote or bag are deposited into the bin, load cells in the forklift 102 are able to verify the weight of the fruit added, comparing the new weight to the weight before the dump. The IMU of the cart 100 ensures that the proper weight is recorded, even if the cart 100 is on a slope; making adjustments to the weight recorded based on the angle of gravity. One or more cameras may record/view the contents of the bin and record/view the fruit being dumped into the bin. This ties the fruit quality directly to a particular picker and the farmer can later review the footage if anything about the bin was off. The cameras 302D/302E may also check for volume, using computer vision. Each bin may have a bar code attached to it to associate a particular bin with pickers depositing fruit.

An additional element of this fruit tracking system allows the easy identification of pickers, without privacy issues. Pickers either download an app on their phone, are given a physical sheet of paper with a barcode on it, or an RFID tag that they can wear around their neck or wrist. When pickers deposit fruit, they can also scan the barcode on their phone or on paper, or the RFID tag, to claim that they picked the fruit. A cloud-based application keeps track of the quantity of fruit picked by each individual bar code. If the picker has the app installed, then this will notify them of how much fruit they have picked and send a push notification when the cart 100 records them adding more to their total. The app may also allow automatic payment based on the amount of fruit picked. If the picker prefers more privacy, and doesn't want to use the app, the picker can simply scan their barcode or tag at the end of the day to be paid the appropriate amount.

In other embodiments of the invention, the cameras monitoring the fruit in the bin may perform real time analysis to determine the quality of the fruit being picked. This can be used to predict the sale price of the fruit, give real time insight to the farmer about the quality of their fruit being picked, and adjust picking strategies on the fly to achieve optimal output. This can also be used to detect undesirable objects such as leaves and sticks, and assess their volume.

Bin and Tote Sizes

Figure 5:
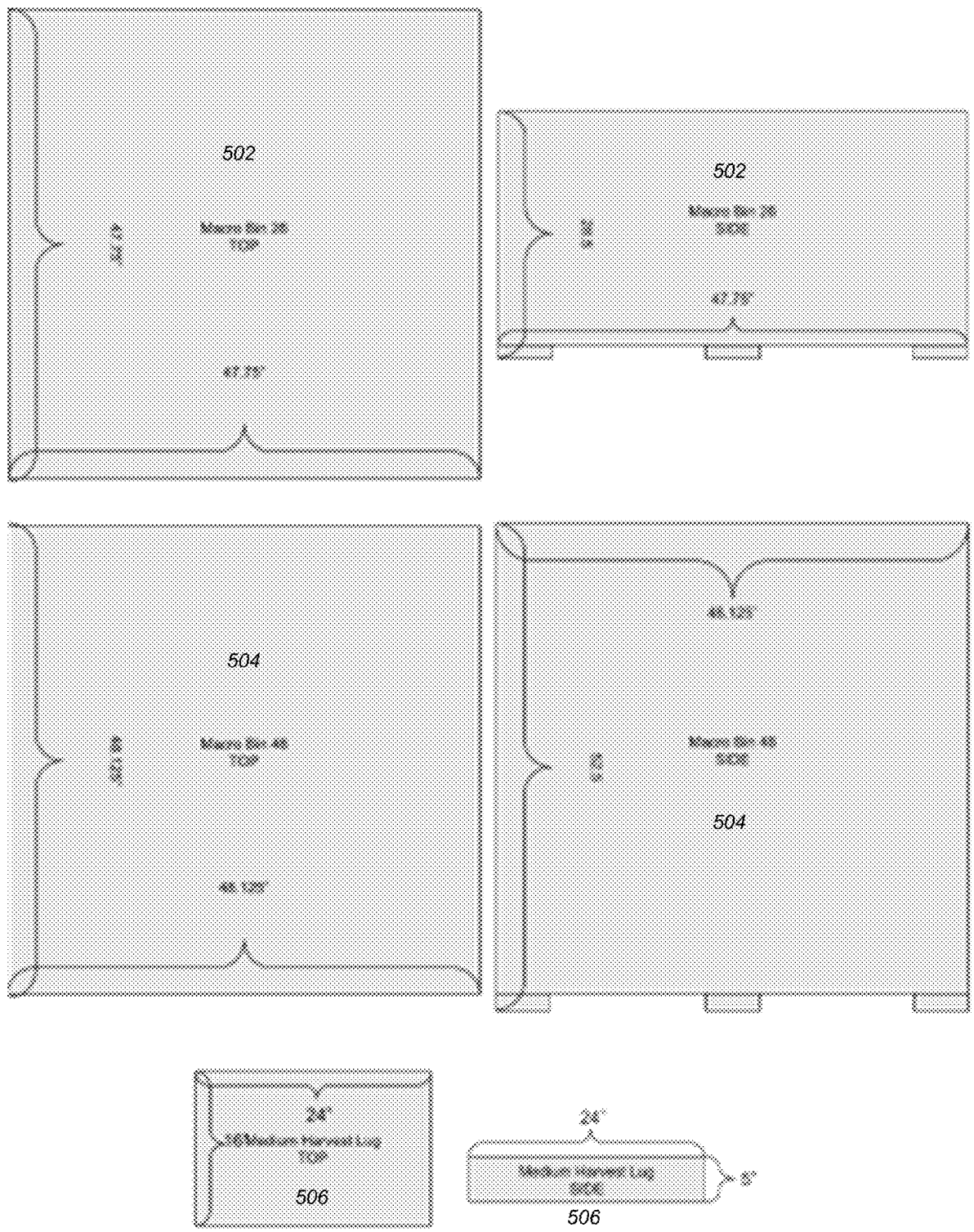
FIG. 5 illustrates common fruit receptacles and potential standard sizes that may be utilized in accordance with one or more embodiments of the invention.

Totes and bins are discussed throughout this document as a standard unit of measurement for carrying fruit. This section briefly discusses the standard bins and totes encountered in orchards. FIG. 5 illustrates common fruit receptacles and potential standard sizes that may be utilized in accordance with one or more embodiments of the invention.

Macro bin 26 502 is the standard for most fruits that are less sensitive to weight induced bruising, such as apples, citrus fruits and pears. Macro bin 48 504 is a larger version of macro bin 26 502, and can carry more, but may cause bruising due to weight in some fruits. The "medium harvest lug" 506 is a common tote size found for cherries, peaches and other softer fruits. The size of these totes 506 can vary, and in later designs, embodiments of the invention ensure that the hardware is flexible enough to support up to 24" by 24" totes, which is the largest that is commonly used.

Additional hardware may be installed as part of a system suite, not on the cart 100 itself, but instead on infrastructure like the bins or totes. This can include simple GPS beacons to locate bins in the field, or April tags for easier image detection and localization via camera.

Alternate Versions of the Cart Base

Figure 6:
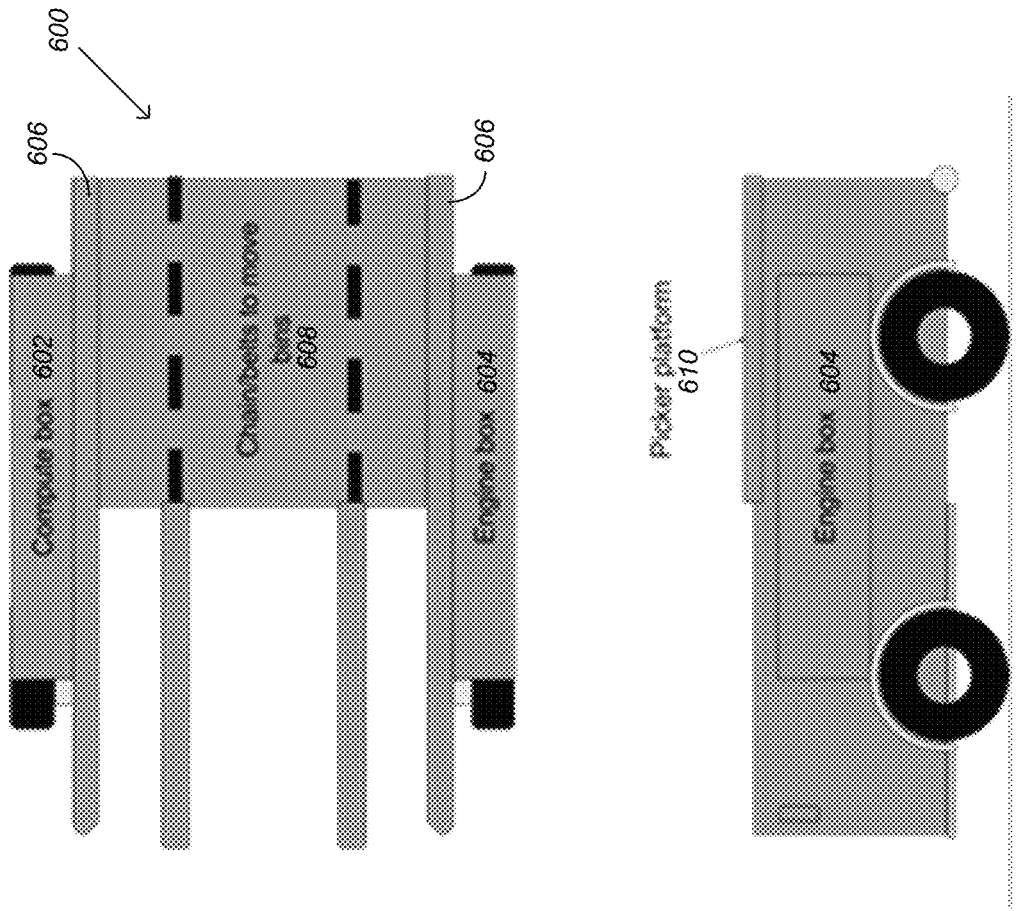
FIG. 6 illustrates a double bin cart in accordance with one or more embodiments of the invention.

While the cart base described above represents one embodiment, the cart 100 can be easily modified to support various operations and applications. In an alternative design/embodiment, the engine components are housed in the sidewall of the cart, allowing two or more boxes to be carried at one time by the cart 100. FIG. 6 illustrates a double bin cart in accordance with one or more embodiments of the invention. In the case where the bins are "half height," as used for picking cherries or other soft fruit, a double bin configuration can support carrying four bins. Half height bins are typically about half the height of the Macro Bin 26 502. As illustrated, the engine components are housed in boxes—compute box 602 and engine box 604 in the sidewall 606 of cart 600. Chains/belts 608 are configured to move the bins as needed. Further, a platform 610 may be utilized for the picker to stand up to provide elevated height for the picker to reach fruit out of reach from ground level.

FIG. 2 also shows a potential alternative design for the cart 100, which allows bins 108 to be stored on top of the engine compartment 204. To enable this, the forklift design would have no "backboard" to allow boxes to slide directly from the forklift to the platform 206 on the engine compartment 204. The forklift would then lift bins up to be level with the engine compartment 204. Belts or chains would be placed on top of the engine compartment 204 to pull bins onto the platform 206. This could also just be done manually; workers store an empty bin on the engine compartment 204 until needed, then they move it off into the forklift area. This would work particularly well for "half height" bins where pickers want to store multiple bins on the same cart 100.

As described above, FIG. 7 illustrates rotating wheels on a cart design in accordance with one or more embodiments of the invention. The cart frame 702 is coupled to one or more pivot arms 704 that contain a mechanism to turn the wheels 106. Motor assembly 104 is utilized to drive each wheel 106 independently. Thus, the wheels 106 are able to rotate 180 degrees on the vertical axis. Such an implementation/configuration allows the cart 100 to move freely in any direction without having to turn the chassis.

Figure 8A:
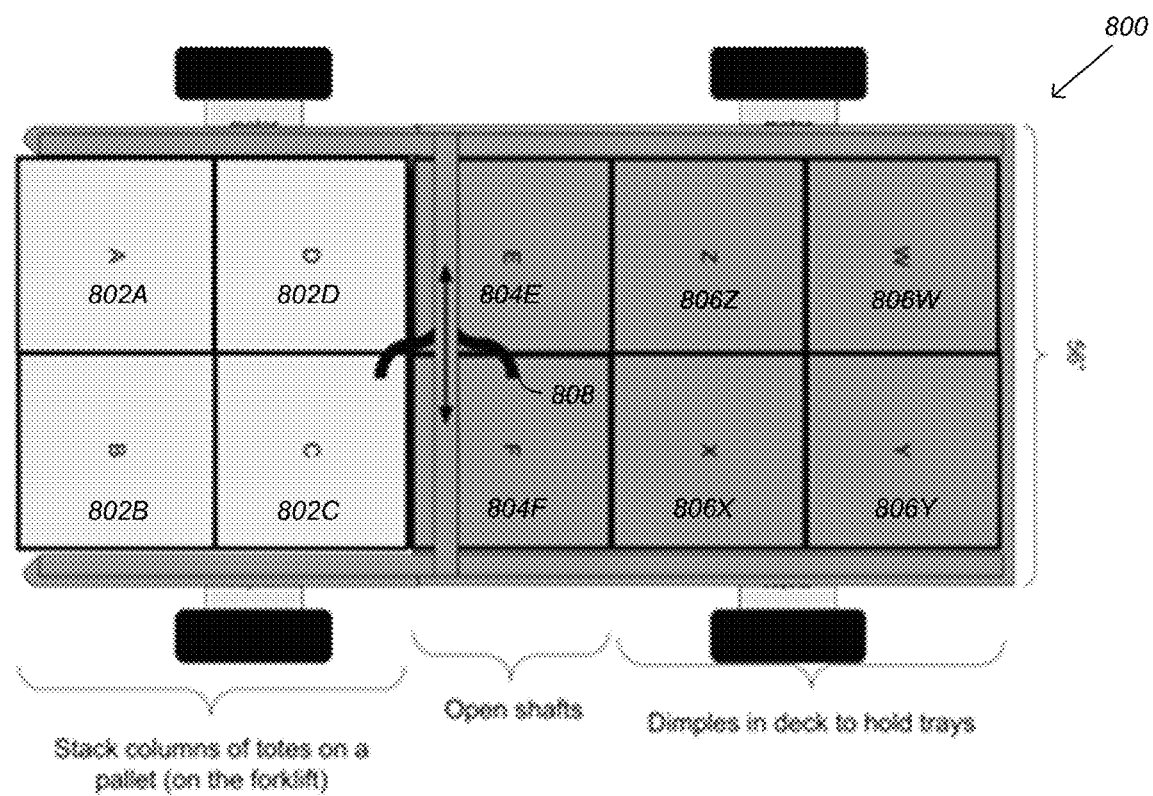
FIGS. 8A and 8C illustrate alternative basic cart designs for a tote carrying cart in accordance with one or more embodiments of the invention.
Figure 8A:
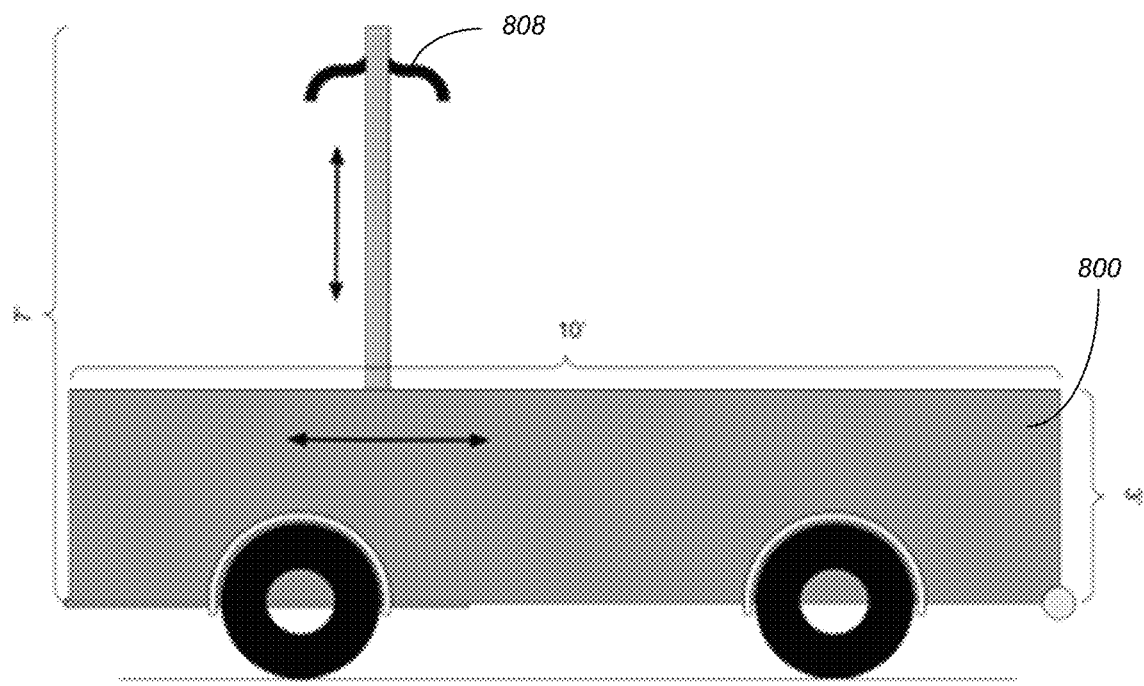
Figure 9:
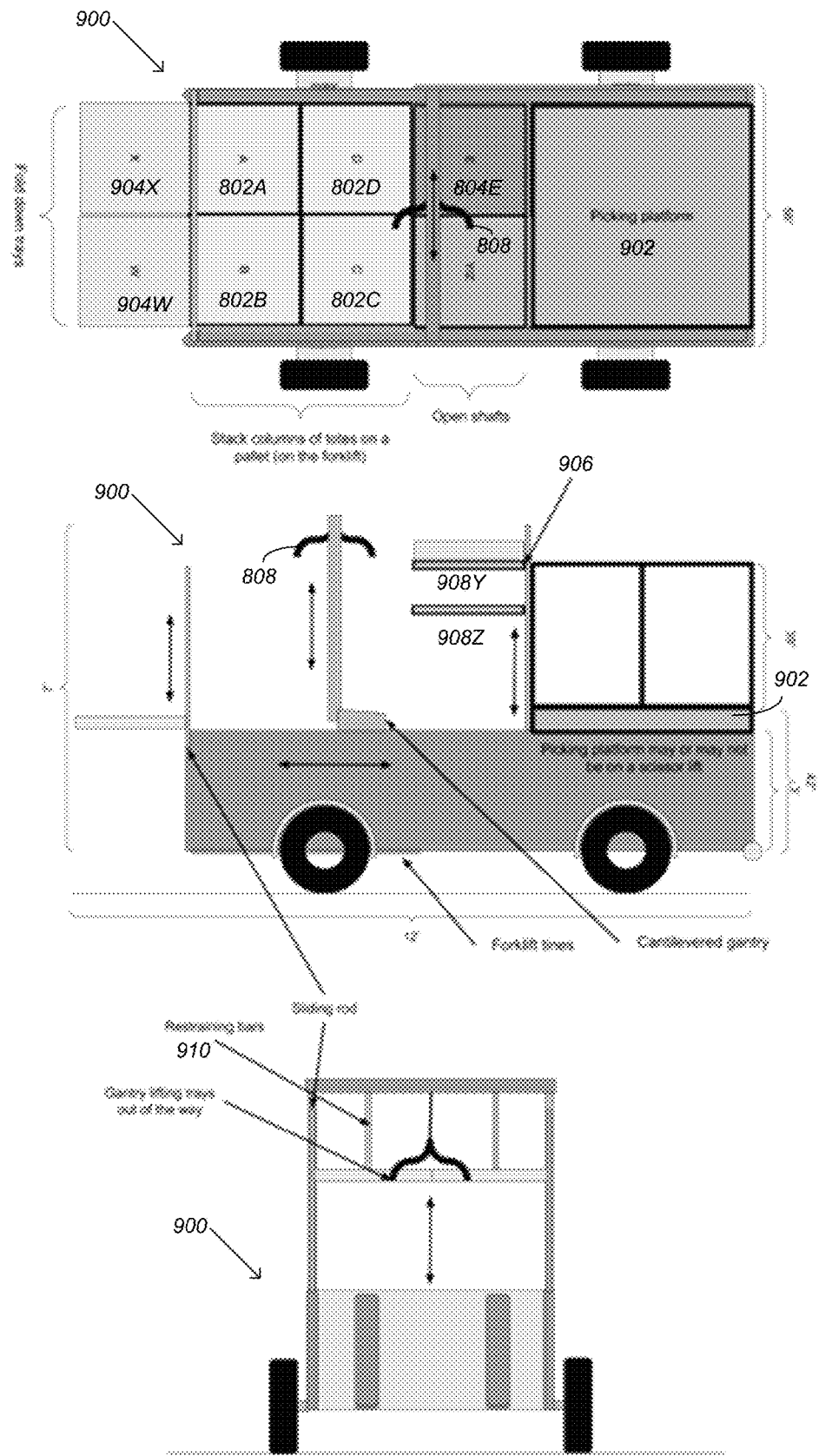
FIG. 9 illustrates an alternative basic cart design for a tote carrying cart with a picking platform in accordance with one or more embodiments of the invention.

The cart is further designed to be flexible in its cargo. FIGS. 8A and 9 illustrate alternative basic cart designs that would enable the management of fruit totes in the field. FIG. 8A illustrates a tote carrying cart while FIG. 9 illustrates a tote carrying cart with a picking platform. Fruit totes 802A-802D (collectively referred to as totes 802) (as opposed to bins) are typically used to carry more sensitive fruit from orchard trees, like peaches or cherries, or from vines, such as grapes. Specifically, embodiments of the invention include a cart base 800 for totes 802 in which a low profile forklift design is combined with the ability to manage picking totes 802 and may include one or more of the following elements: (1) Extensibility; (2) Ability to carry heavy loads; (3) Low profile; (4) Built for autonomy; (5) Off-road and on road; and (6) Built specifically to manage picking totes.

FIG. 8A shows how a slightly longer cart 800 could be used to transport and manage such totes 802, which can have a wide variety of sizes, including ones like 24"×24"×5" to 24"×16"×9". A pallet or bin is placed on the front forks of the cart 800 to hold full totes 802, and there are open shafts 804E-804F in the frame to hold empty totes 802. The dimples 806W-806Z shown on the back of the cart 800 are used to receive newly full totes 802 and distribute empty ones. Totes 802 are moved around the cart 800 by the gantry mechanism 808. Algorithm 1 below describes the algorithm that would be used to move totes around on the cart. Algorithm 2 describes an adaptation of the algorithm to more effectively support totes of a slightly smaller dimension; 24"×16" (this works for any tote depth). The gantry claw 808 will have the ability to rotate totes 802, so the algorithm can be applied to any stack orientation desired on the pallet, including irregular orientations.

FIG. 9 shows an embodiment of the tote cart 900 that adds another two feet to the total length, to allow a picking platform 902 to be used on the rear of the cart 900. In this embodiment, trays 904X and 904W (collectively referred to as trays 904) are added to the front of the cart 900 to receive full totes 802 and distribute empty ones at ground level. These trays 904 are moved up out of the way of the forklift by the gantry so that it can drop off or receive a new pallet (or bin) of totes 802. If a scissor lift is being used, an elevator system 906 is used to get totes 902 up to the pickers on the platform 902, and receive full picked totes 902 from them. If no scissor lift is being used, this elevator 906 would just become a two level shelf. The lower level shelf 908Z is motorized to allow it to move laterally over the empty shaft 804E, where the gantry 808 is able to access it without the upper shelf 908Y being in the way.

Stacks of totes 802 have the potential to tip over, so vertical restraining bars 910 are added to the three fixed walls around the cart's pallet enclosure to prevent this. These bars 910 could be narrow and are needed roughly in the middle of each vertical stack. The open end of the pallet enclosure (the front of the cart) may require removable restraining bars 910 (e.g., sliding rods) to allow pallets to be loaded and unloaded without the bars 910 being in the way. If the cart 900 doesn't have a picking platform 902, restraining bars 910 may be attached to actuators near the front of the cart 900 that would rotate them out of the way. If the cart 900 has a picking platform 902, then it may also require front trays 904 as described above, and the restraining bars 910 would be attached to the back of these trays 904.

Both the cart base and the tote cart (described above) can be adapted to refrigerate fruit, particularly cherries, to keep them cool in the field. This can be done in a couple ways. One embodiment includes the installation of a drop in fridge in the "open shaft" section of the tote cart. Another embodiment includes the installation of fans that blow cool air from the arms of the cart onto the fruit being carried by the forks.

In addition to the above, embodiments of the invention can adapt the carts to carry items other than fruit; simply by placing some sort of receptacle in the forks to hold the items in question. Further, in specific implementations, the cart may be rated to carry up to 2 tons of material.

While the carts described herein may be designed for orchards, the cart may also be viewed as an off road autonomous forklift. Thus, such an offroad autonomous forklift/vehicle can feasibly be used in many settings. Exemplary settings include anywhere where there is a need to carry heavy loads over rough terrain. Such settings may include construction sites, other agriculture settings outside of orchards, military operations, and/or any setting thing where an off-road forklift with no driver can be applied.

Tote Handling Algorithm 1

Figure 8B:
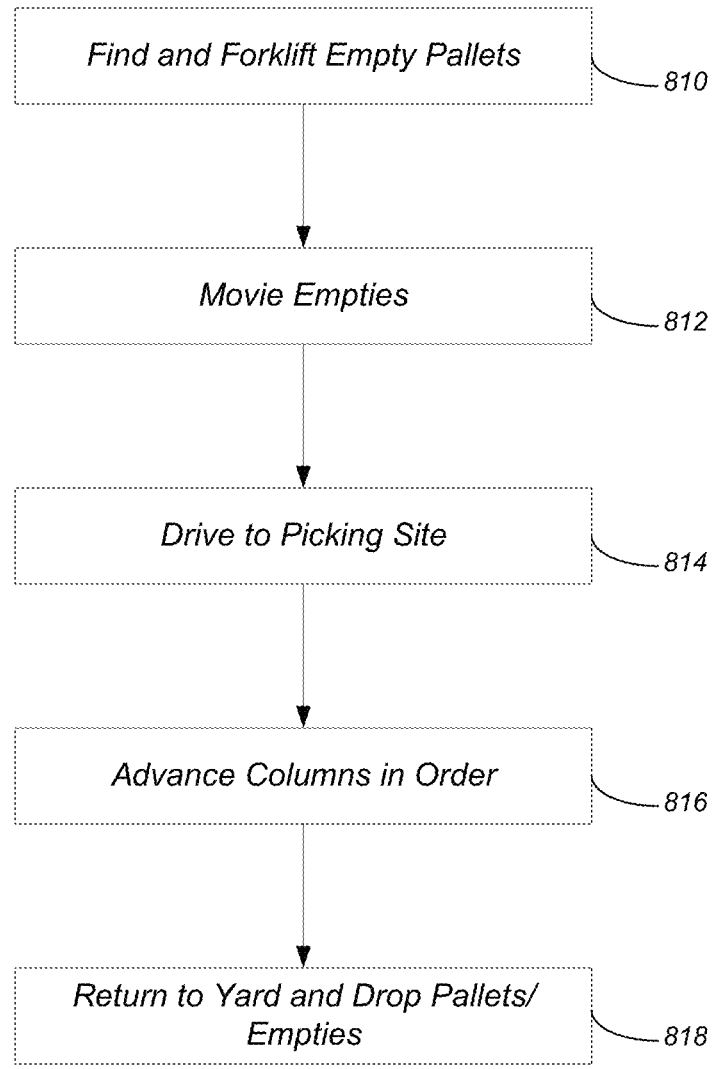
FIG. 8B illustrates the logical flow for an algorithm for handling totes in accordance with one or more embodiments of the invention.

This algorithm can best be understood in reference to FIGS. 8A, 8B, and 9.

"Fulls" are full totes 802, and "empties" are empty totes 802. At any given time, a single column, 802A through 802E, will be the only source of empties. At the same time, another single column, 802A through 802E, will be the only destination for fulls. Dimples 806W and 806Y are generally where pickers place fulls, and dimples 806X and 806Z are where pickers get empties to fill. If pickers place empties or fulls in the wrong dimple 806, the algorithm handles it. Totes 802 can also be stacked in the dimples 806, but generally are only one high.

The priority for claw (i.e., gantry mechanism 808) attached to movements may provide:
1. If dimples 806X or 806Z are clear, move an empty there from the active source column.
2. Fulls placed on 806X or 806Z are moved to the active destination column.
3. Fulls placed on 806W or 806Y are moved to the active destination column.
4. Empties placed on 806W or 806Y are moved to 806X or 806Z, if either is clear, otherwise they are moved to the active source column.

FIG. 8B illustrates the logical flow for the algorithm for handling totes in accordance with one or more embodiments of the invention.

At step 810, the cart 800 finds a pallet of empties in the yard and forklifts it.

At step 812, at the yard, while on standby, the empties in column 802A are moved, one by one, to column 804E. Doing this at the site reduces the chances of a column topple on the quick and bumpy drive to the picking site. This operation increases the lead time needed to swarm the cart 800 but lead times can be more accurately predicted with totes, because a full tote count is highly quantifiable compared to a gross bin weight.

At step 814, the cart 800 moves/drives forward to the picking location and claw movements respond to events.

At step 816, the columns are advanced in a particular order. The initial source column is 802B, and destination column is 802A. Thereafter, the columns are advanced in the following order:

| Source: | 802B | 802C | 802D | 804E |
|---|---|---|---|---|
| Destination: | 802A | 802B | 802C | 802D |

Generally, the columns will be moved through in sync, but they can get out of step. If the source column advances before the destination column, there's no problem—a bunch of totes are just out being filled. If the destination column advances before the source column, there's a problem, because fulls could be placed on top of empties. This situation arises when there are spare totes in the area, and the pickers have filled them. When this happens, the source column must be cleared, as an overriding priority. Its empties are moved to 804F. If there's a tote elevator instead of a column 804F, its empties must be stacked on dimple 806Z. If dimple 806Z gets stacked to maximum there's a warning buzzer.

At step 818, the cart 800 returns to the yard and drops pallets (full or empties) as needed. More specifically, when destination column 802D is stacked to the top, the cart 800 returns to the yard and drops off the full pallet. If there are empties in column 804E or 804F, or dimple 806Z, they need to be dropped off. This is done at a designated pallet that is straddled/forked just for the duration of this deposit.

Tote Handling Algorithm 2

Figure 8C:
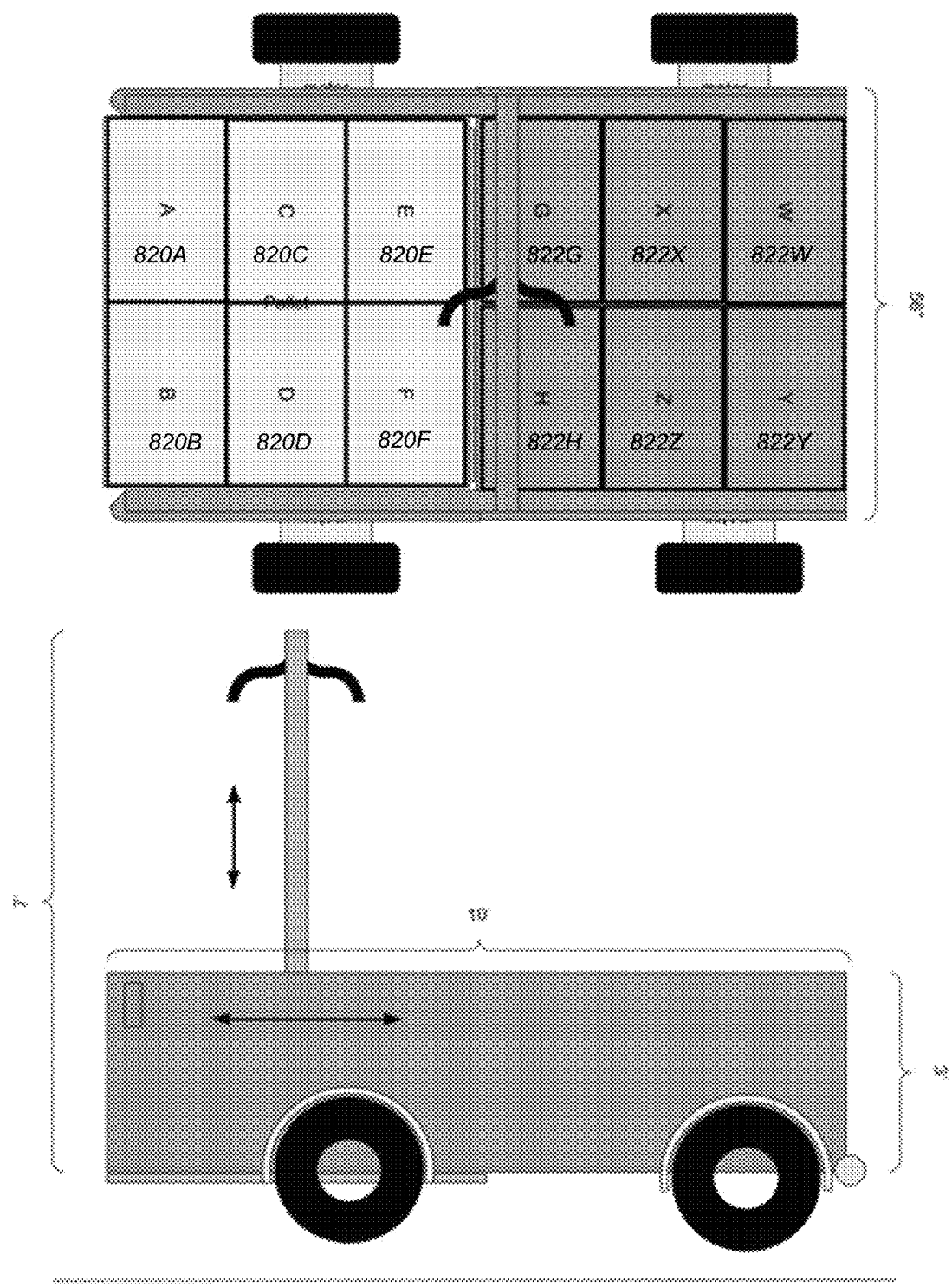

This algorithm can best be understood in reference to FIG. 8C which illustrates an alternative card configuration in accordance with one or more embodiments of the invention.

"Fulls" are full totes, and "empties" are empty totes. At any given time, a single column, 820A through 820F and 822G, will be the only source of empties. At the same time, another single column, 820A through 820F and 822 GG, will be the only destination for fulls. Dimples 822W and 822Y are generally where pickers place fulls, and dimples 822X and 822Z are where the pickers get empties to fill. If workers place empties or fulls in the wrong dimple, the algorithm handles it. Totes can also be stacked in the dimples, but generally are only one high.

The priority for claw movements:
1. If dimples 822X or 822Z are clear, move an empty there from the active source column.
2. Fulls placed on 822X or 822Z are moved to the active destination column.
3. Fulls placed on 822W or 822Y are moved to the active destination column.
4. Empties placed on 822W or 822Y are moved to 822X or 822Z, if either is clear, otherwise they are moved to the active source column.

FIG. 8B also illustrates the algorithm for handling totes when six (6) columns are on the pallet in accordance with one or more embodiments of the invention.

At step 810, the cart 800 finds a pallet of empties in the yard and forklifts it.

At step 812, at the yard, while on standby, the empties in column 820A are moved, one by one, to column 822G. Doing this at the yard reduces the chances of a column topple on the quick and bumpy drive to the picking site. This operation increases the lead time needed to swarm the cart 800 but lead times can be more accurately predicted with totes, because a full tote count is highly quantifiable compared to a gross bin weight.

At step 814, the cart moves/drives forward to the picking location and claw movements respond to events.

At step 816, the columns are advanced in a particular order. Differing from the first algorithm described above, the order of advancement of the columns differs with six columns. The initial source column is 820B, and destination column is 820A. The columns are advanced through in this order:

| Source: | 820B | 820C | 820D | 820E | 820F | 822G |
|---|---|---|---|---|---|---|
| Destination: | 820A | 820B | 820C | 820D | 820E | 820F |

Generally, the columns will be moved through in sync, but they can get out of step. If the source column advances before the destination column, there's no problem—a bunch of totes are just out being filled. If the destination column advances before the source column, there's a problem, because fulls could be placed on top of empties. This situation arises when there are spare totes in the area, and the pickers have filled them. When this happens, the source column must be cleared, as an overriding priority. Its empties are moved to 822H, which is otherwise unused. If there's a tote elevator instead of a column 822H (which happens when there's a picker platform), its empties must be stacked on dimple 822Z. If dimple 822Z gets stacked to maximum there's a warning buzzer telling the workers that they have to remove some of the empties and set them aside.

At step 818, when destination column 820F is stacked to the top, the cart 800 returns to the yard and drops off the full pallet. If there are empties in columns 822G or 822H, or dimple 822Z, they need to be dropped off. This is done at a designated pallet that is straddled/forked just for the duration of this deposit.

The algorithm for when four (4) columns are on the pallet is the same, except that there are no columns 820E or 820F. This means that the columns are advanced through in this order in step 816:

| Source: | 820B | 820C | 820D | 822G |
|---|---|---|---|---|
| Destination: | 820A | 820B | 820C | 820D |

Thereafter, in step 818, the cart 800 returns to the yard when column 820D is stacked to the top.

Software

The software side of the cart is designed around a simple user experience, utilizing low cost autonomy sensors and an embedded compute platform. It will facilitate several major functionalities, detailed below, as well as extensible additional functionalities via the cart software API.

Cart Transport

In one or more embodiments of the invention, the cart is able to autonomously navigate between its current location and a GPS (global positioning system) destination provided by user input, or by a higher level fleet management system. The cart also is able to avoid obstacles in its path, and to come to an emergency stop if it is in danger of injuring itself or others. Finally, the cart is able to transport fruit bins or other payloads via the forklift described in FIG. 1, and it can autonomously pick up or drop off such payloads at either the beginning or end of this navigation. To enable this functionality the cart utilizes a subset of the sensors described above, coupled with an autonomy software stack.

In some cases the autonomous tasks, such as picking up a bin in tall grass, may be too difficult, or the cart may encounter unexpected situations. In these cases, the cart will have the ability to have a remote operator or manual driver take over for a period of time.

A specific task of this type would be for the cart to pick up bins that have been identified/located in the orchard using a phone app that employs GPS and return them to the yard. Such pick up requests could be queued up in the fleet management system. It is also possible that a cart could autonomously drive through the orchard, seeking full bins to return. Accordingly, one or more embodiments may provide a smartphone based approach for requesting carts where the smartphone uses GPS to request carts in an orchard setting, and the cart may receive directions with phone GPS.

Another autonomous operation done by the cart is to navigate to one or more charging stations when its power levels are getting low. The cart would inform the fleet management system of its need to do so and drop off any loads first.

Figure 10:
FIG. 10 illustrates the logical flow for transporting a cart in accordance with an autonomy stack of one or more embodiments of the invention.

The autonomy stack to support this operation would take the high level form as described in FIG. 10. In this regard, FIG. 10 illustrates the logical flow for transporting a cart in accordance with an autonomy stack of one or more embodiments of the invention. One or more of the novel features of the autonomy stack may be found in the object detection 1002, localization 1004, semantic understanding 1006, environmental model 1005, decision and control 1007, fleet management 1008, and safety systems 1010 blocks.

As illustrated, external sensors 1001 are used to detect objects (via object detection 1002). Sensor fusion 1003 combines sensor readings (from external sensors 1001) to establish an environmental model 1005. The environmental model 1005 is also based on the location of the cart (determined via localization 1004 which also utilizes external sensors 1001 such as GPS). The environmental model 1005 may utilized by the system to determine where the Kart can safely drive and may be continuously updated and reused via machine learning/artificial intelligence. The localization 1004 and environmental model 1005 may also be used to perform semantic understanding 1006 which allows an autonomous system to make judgments about the objects around it; "safe-to-follow," "safe-to-ignore-," or "ignore-with-caution." Decision and control module 1007 receives information from the semantic understanding module 1006 as well as the fleet management system 1008 in order to make decisions and control movement of the cart along a desired trajectory which is performed by trajectory execution module 1009. Safety layer 1010 (which may include both a hardware layer as well as software layer) may be used to ensure the safety of workers in the orchard during cart movement. Based on the prior modules, the vehicle movement is controlled via vehicle control module 1011. Details for one or more of these processes is described below.

Embodiments of the object detection 1002, semantic understanding 1006, and environmental model 1005 blocks may be particularly focused on operating a cart within an orchard. Open source models may be used for certain objects, especially humans and vehicles, but embodiments of the invention may retrain them with images of the objects in an orchard. Further, objects found in an orchard that do not have readily available models may need to be trained from scratch. This likely includes picking ladders, certain types of trees, certain fruits and other common orchard items.

For localization 1004, embodiments of the invention take a unique approach due the complexities of navigating an orchard. The branches overhead will likely result in partially or fully occluded GPS at points. Normally, one would still be able to localize with SLAM (simultaneous localization and mapping) methods and a particularly good three dimensional map (point cloud based). However, this also may be a challenge, due to the movement of trees and the fact that many tree rows will likely appear the same in a point cloud. Additionally, embodiments of the invention may use low cost sensors (i.e., external sensors 1001) as a multi layer lidar may be cost prohibitive. Embodiments of the invention provide a unique approach to solve this problem and may rely on the fact that orchard trees are somewhat uniformly distributed (see below description of "cart Tree Strafing" for more details).

The decision and control module 1007 in an orchard environment will be uniquely suited to operating in orchard aisles. It will also need to operate within "sub-lanes" of the same aisle (as described below in the "cart Tree Strafing" description). On the control side, the need to effectively navigate orchards and allow pickers easy access to trees necessitates some inventive approaches to driving. As described above, such driving may include four wheels that will be able to independently rotate 180 degrees on the vertical access, so that the cart can move completely laterally as well as longitudinally. In other embodiments, this may also include the following approaches to control:

Ackermann based driving control; the back two wheels are fixed, the front two can rotate on a rack and pinion and work to steer the vehicle; and/or Differential or "skid steer" based driving control; all four wheels are fixed and operate independently. The wheels on the left and right side of the cart are rotated in opposite directions to turn the cart.

The safety systems (i.e., paired to safety layer 1010) for the cart are designed such that it is collaborative and able to safely interact with humans without causing harm. There are several redundant levels/layers to the safety system (e.g., that may act as fail safes if a "higher" level/layer malfunctions). At the lowest level of the safety layer 1010 is a hardware emergency stop. The hardware emergency stop is one or more physical hardware switches that cut power to all systems that physically actuate the control of the cart—the cart then immediately ceases to operate. The mechanism for this is described above.

The next level up from the hardware based emergency stop is a software based emergency stop. Upon triggering this emergency stop via software signal, the system will lock the wheels and any other physically actuated systems on the cart, immediately halting operation. This software emergency trigger will be available to any processes that may be involved in the operation of the cart. It will automatically be triggered in the eventuality that critical software systems on the cart fail. It will also be available as a physical button on the cart, and as a software based button that resides in all software user interfaces available to users. When this signal is being communicated over networks, it will be given priority over other data being transmitted, via its own socket based communication channel. The software module which executes this operation will be isolated from other software processes and can reside on a separate embedded computer. Such a software based safety stop may be configured/triggered for activation in two specific ways: (1) the first way is by a strip running around the exterior of the cart, that triggers the safety stop when depressed; (2) the second way is by injecting a safe voltage into the frame of the cart and then detecting when that voltage is grounded; i.e., someone touches the cart (i.e., conductivity is used in the frame to detect human touch).

The software based emergency stop may be paired with/ be provided by safety layer 1010. This safety layer 1010 can also reside on a separate embedded computer, and will constrain physical actuation of the cart to within certain limits determined by the user and based on the physical environment the cart is operating in. This safety layer 1010 will constrain the cart by limiting max speed and max acceleration of all physical actuators. If incoming commands are consistently outside of recommended operating range, the safety system can shutdown autonomy due to a potential internal malfunction. It will also be monitoring the operation of the main autonomy software to ensure that it is functioning properly at all times. This monitoring can include requesting status heartbeats from all critical processes to ensure they are operating safely. Note that as used herein, "autonomy" refers to the cart/cart system moving and/or operating autonomously without user interaction and control.

The next level above the failsafe designed to halt the cart in an emergency scenario are the software systems that attempt to avoid an emergency altogether. This is handled by the object detection 1002, semantic understanding 1006 and decision and control 1007 modules.

Sensor fusion 1003 will combine sensor readings from the lidar, radar and camera sensors (i.e., external sensors 1001) to detect potential obstacles (i.e., object detection 1002) further away. Ultrasonics will be utilized to ensure there are no potential obstacles close to the cart. The cart will default to requesting clarification if it is unable to categorize or classify an object. That is, it will stop and request feedback from a human if it is unsure how to proceed.

An additional strategy that can be used to increase the accuracy of human detection and overall safety of the cart is by using radio beacons carried by the human operators. This could also be done with an app or a smartphone. The app would use techniques described in the "cart follow along" section below to determine how close other humans are and whether it is safe to operate. All humans would be required to carry the app, or radio beacon, while collaborating with the cart. The cart would then refrain from operating when humans were within range.

Carts may be geofenced by the farmer when setting up a cart system. This prevents farmers from driving outside of the operation zone of the orchard.

Embodiments of the invention may also comply with ISO standards 17989, 11783, 15003 and 25119 in iterations of the product.

Cart Follow Along

In embodiments of the invention, the cart may be able to follow workers (e.g., humans/group of humans) in the field, or orchard, maintaining an optimal location in order to allow for the work being done with a minimal walk back distance to the cart to deposit the results of that work (usually fruit). This would typically be done with one or more workers in an orchard row, but this functionality is not constrained to that environment. It could be very easily used in an open field, or in other environments that have nothing to do with agriculture. For example, carrying heavy items around a construction site would be a straightforward application of this technology.

The approach involves using a filter to track several objects together and then amalgamating those tracked objects into an overall estimate. Key Elements may include: (1) the ability to track multiple humans reliably using filtering and amalgamation techniques; and/or (2) the ability to calculate an optimal placement of multiple carts to minimize walking distance, given the location of all pickers.

From a user perspective, this functionality is simple. Through a smartphone based UI, or UI located on the cart, the worker is able to select an optimal following distance. The cart will then begin to follow the worker at the selected distance until it is unable to continue, or the worker switches this functionality off. If there is more than one worker, the cart will move (given physical constraints) towards their center of mass, as this will be the optimal location to minimize overall walk backs. If the cart is unable to continue it will notify the workers via the smartphone based UI and through an audible tone.

If there is more than one worker, they can each opt in and out of the following system. Also, some may forget to do so when departing the group, and as their location begins to deviate significantly from the group, they are automatically dropped from the group. The smartphone app will provide other control by the group, including calling for a cart, returning one to the yard, flagging one as being full, noting damage and malfunctions, ending the day, or even giving the group a name. Within the group, levels of authority (involving passwords even) could be employed that give some workers priority in control or cart following.

From an implementation standpoint, cart follow along relies on a sensor to determine roughly how close the user, or users, are to the cart, and then a filter to reduce sensor noise and obtain an accurate distance from the group. With all sensor types, except for one involving manual input or voice control, a similar mathematical approach would be used to estimate the movement of the group relative to the cart. This involves utilizing a multi-object extended Kalman Filter, or Unscented Kalman Filter, to track movement despite sensor noise. Once individual users are tracked through the chosen Kalman filter, the mean of their collective distances from the cart would be calculated. This would then be used to determine whether the cart needed to move forward.

Figure 11:
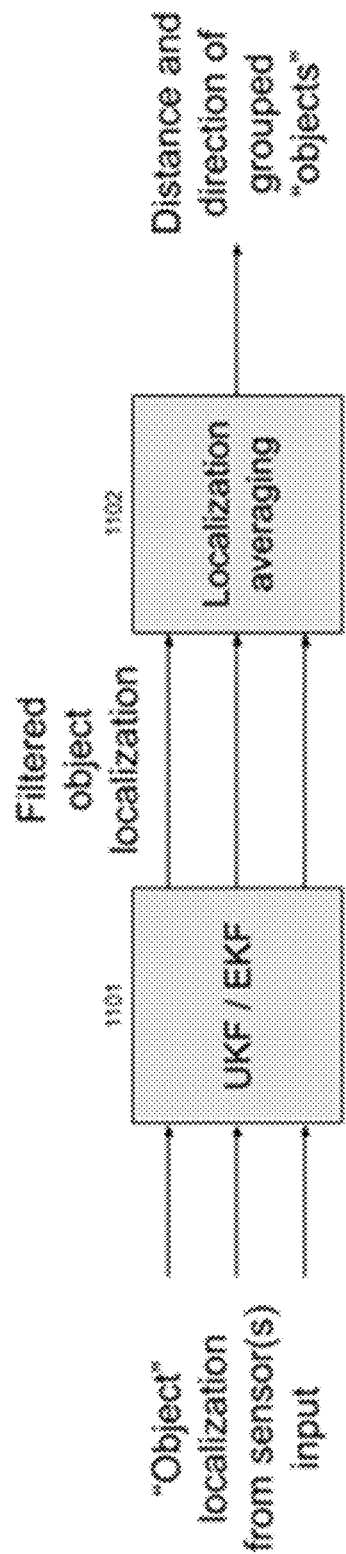
FIG. 11 illustrates the flow of a follow along filter in accordance with one or more embodiments of the invention.

FIG. 11 illustrates the flow of a follow along filter in accordance with one or more embodiments of the invention. The "object" localization from sensor input is passed to the filter 1101. The filter 1101 (e.g., the Unscented Kalman Filter or Extended Kalman Filter) is used to get an accurate localization (i.e., the filtered object localization) despite sensor noise. The filtered object localization is then averaged at 1102 to determine the location of a group (i.e., the distance and direction of grouped "objects"), instead of individuals. It is envisioned that user settings would configure the cart follow along at a certain desired distance.

Using the same distance sensor and Extended Kalman Filter or Unscented Kalman Filter, each cart is able to track the location of all cart users, by sharing this information via the cart network. By doing so, carts are able to position themselves such that for all users, the average between each user and the nearest cart is minimized. The application running in the cloud, over the cart network, groups individual users based on the number of carts available and the distribution of the pickers. It runs a gradient descent algorithm, or genetic algorithm, to minimize the walking distance of each picker to a cart location. When this is solved, it sends carts to the appropriate locations.

The following four approaches provide various embodiments that may be used to provide sensor input to the filter 1101:

(1) As explained in the hardware section of "Cart Base," each base will include a Wi-Fi hotspot. If workers in the field connect to this hotspot then a signal strength measurement in decibels can be obtained via an app running on the workers phone. This would then be transmitted over to the cart base, allowing it to perform the calculations shown in FIG. 11. This approach may only be useful in orchard rows, where the cart is already driving down the row autonomously, as this sensor may only give a rough estimate of distance and not a direction.

(2) The second approach uses the workers GPS position, as recorded by their cell phones. An app running on each user's smartphone would record the position of the user and transmit this position to an application running on a server in the cloud. The cart base would also transmit its own position to the cloud as an additional object. The application running in the cloud would perform the calculations shown in FIG. 11 and then transmit the resulting directions back to the cart base. This approach could be used in open fields as well as rows, as the cart would be able to determine a distance and direction of the group.

(3) The third approach involves sensors typically used for object detection and tracking. This could be lidar, radar, cameras, or a combination of sensors. Using object detection and sensor fusion software, in addition to the approach described in FIG. 11, objects in front of the cart would be tracked as a group. If that group were to move away from the cart further than the specified distance, the cart would then pursue them. This approach could be used in open fields as well as rows, as the cart would be able to determine a distance and direction of the group.

(4) The final approach involves manual input from a human to tell the cart to move forward. This could involve a smart phone application, with buttons or voice commands to initiate movement. The smart phone application would then be linked to the cart via the cloud. This could also be implemented as voice commands communicated directly to a microphone on the cart. A final version of this could be a camera on the cart recording gestures from the workers and then using them to determine whether to move forward.

Cart Tree Strafing

Cart tree strafing describes the functionality that enables the cart to very precisely control itself at a consistent, human selected, speed to allow for easy picking of tree fruit. The human is able to specify a "lane" within an aisle which is a consistent distance from the row of trees. The cart then stays within that lane, keeping the same distance from either the trunks or outer canopy of the row of trees as it proceeds down the aisle. The human is also able to select a consistent speed at which the cart proceeds down the aisle. The cart will then maintain this speed, despite unevenness in the terrain or other external elements.

In other words, the cart tree strafing uses trees as objects to localize and position the cart within the aisle. Wheel speed is used to estimate the speed of a ground cart and "lanes" are created within an orchard aisle for navigation. Key Elements may include: (1) being able to precisely navigate within an orchard aisle; (2) being able to drive at a specific speed while GPS denied; and/or (3) being able to navigate within a row while being GPS denied.

The UI to input these commands will be a combination of controls directly affixed to the cart, and "remote controls" or smartphone app. FIG. 4 illustrates an example of a remote control that might be used to specify cart speed and a lane within the aisle. The buttons shown would be used to make these adjustments. Since there are multiple sources of control of the cart, priority has to be given to certain users. For example, users standing on the picker platform will be given priority over users not riding on the cart. This is for safety; someone riding the cart should have the ability to preferentially control it. As described in "cart follow along," user proximity to the cart can be determined via multiple techniques.

To determine where the cart is located in the aisle, and whether it is within its lane, multiple sensors may be used. RTK (real time kinematic positioning) or GNSS (global navigation satellite system) based GPS is always a good estimator. However in occluded environments, such as under trees, it can't always be relied on. To get a better ground truth, a combination, or subset, of sensors (e.g., lidar, radar, and/or cameras) may be used to detect the tree rows. Once the tree rows are accurately detected, a controller coupled with an appropriate steering model can be used to steer the cart to ensure it is within the designated lane. This approach differs from typical robot localization and control in that most robots are dependent on localizing themselves in a global frame before attempting to navigate. In embodiments of the invention, carts localize themselves within the global frame while outside of an orchard row, but once inside the row switch to local localization with only rough global localization. This has the advantage of being more flexible, and since the carts do not need to globally localize to drive down a row, is the preferred approach. What follows is a description of how each of these sensors can be utilized to provide local positioning and thus drive the cart down a row.

In addition to the above, to aid in navigation, the concept of perception is performed in both 2D and 3D space for the most accurate understanding of the farming environment. 2D and 3D perception data from multiple sensors are combined together via a calibration process.

2D perception involves using RGB color from the camera in detecting and tracking various objects such as people, ladder, bins, tree trunks etc. It is also used in row identification which can be used for localization. 2D perception also involves off-road segmentation to detect ground, dirt, grass, trees etc. This layer relies heavily on deep learning techniques such as object detection, object classification, semantic segmentation etc.

3D perception is used for accurate detection of the presence of obstacles using LIDAR/depth data. The distance and shape estimation of obstacles are performed in order for the robot to navigate safely without collision. Point cloud based clustering algorithms along with deep learning techniques may be used for this purpose.

Lidar can be used to look for tree trunks, which will return as a rough semi circle, with a solid reflection and no pass through. This will be picked up well by a CNN (convolutional neural network), trained to look for objects with this shape and type of reflection. There are a few potential challenges to this approach. The first is occlusions in front of the trunk such as branches, grass, humans or other objects. The second is dust in the air, which will block the lasers and make the sensor less accurate. The third is robustness—lidar sensors often have mechanical rotating parts in them, which are sensitive to vibration. The final challenge is price—many of the aforementioned issues could be solved with more robust sensors that can see through occlusions or dust, but are more expensive. The main decision to be made with this sensor is how many layers, or how much detail, is needed to properly detect trees given the challenges mentioned. This will dictate price.

Radar is a good option to look for tree rows because it is robust to many of the issues described with a lidar sensor. Radar passes through dust and other obstacles that are not solid enough to reflect the wave. Thus, it could be utilized effectively to "see" tree trunks, but ignore foliage and other occlusions. A CNN, or heuristic algorithm, could be trained effectively to detect the trunks. The main challenge with radar is the cost. Radar is relatively cheap for an automotive sensor, but still costs a few thousand dollars per sensor. Another challenge is the resolution of radar sensors. They don't give as detailed sensor information as lidar does—enough to detect objects but not map the environment.

The final sensor that will be a good fit to detect tree rows is a stereo camera or cameras. There are existing CNNs trained to detect trees. These would likely need to be refined, but could accurately locate trees as whole objects, or likely their trunks. Cameras are also cheap, which is great. A disadvantage of this approach is that cameras can be occluded by dust, rain and other objects, similar to lidar. Both lidar and cameras can use a CNN to detect whole trees, however since they are of irregular shapes, this may not give the most accuracy within the row. Cameras can however also more easily detect the aisle itself, and open space within that aisle. The following paragraphs describe such an approach in depth.

The previous paragraphs in this section described in high level terms how sensors could be used to locally localize a cart within a row. The next few paragraphs describe in more detail how a stereo camera, which gives color and depth data about its surroundings, could be used for this task.

Figure 12:
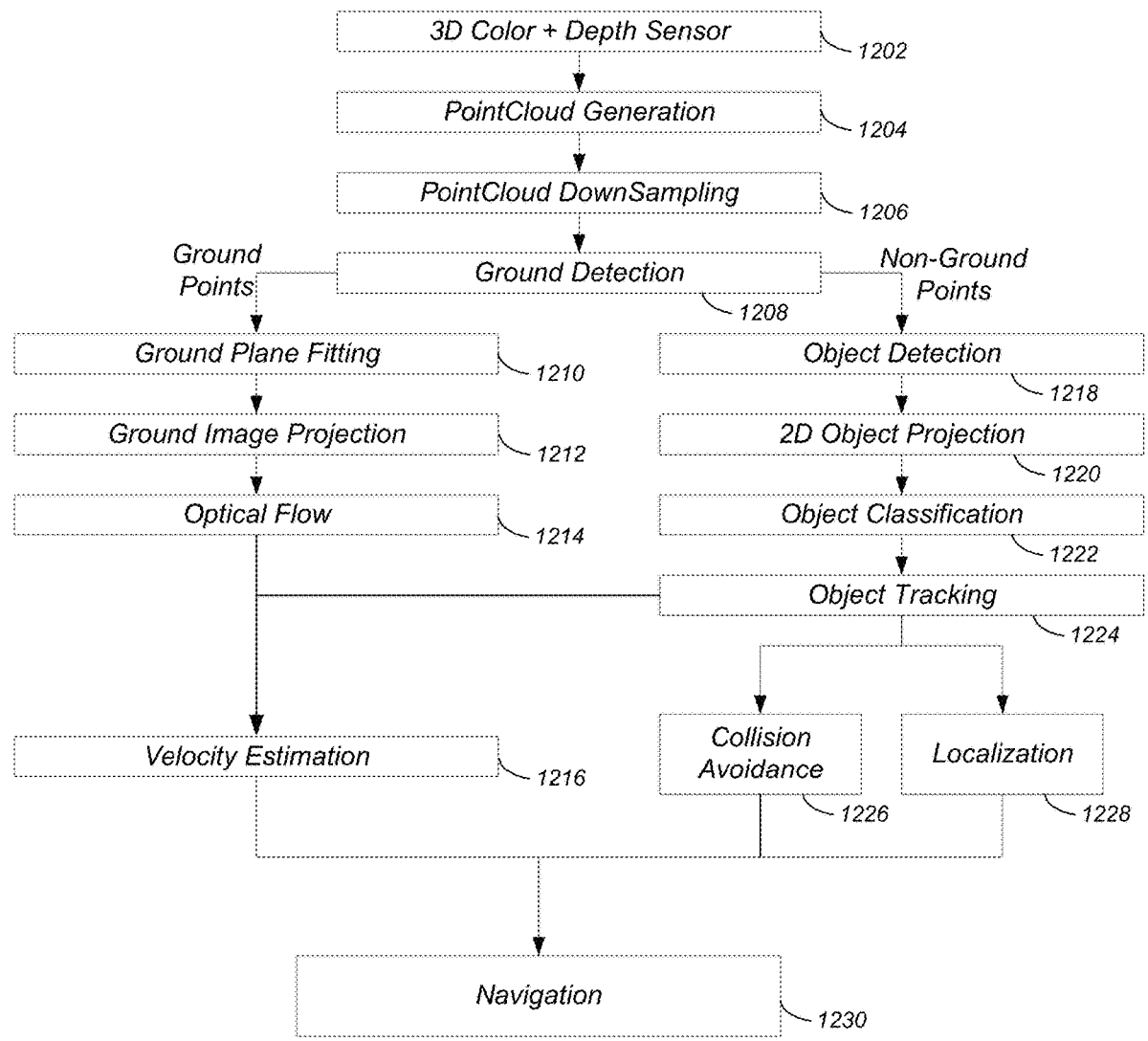
FIG. 12 illustrates the logical flow for stereo camera based segmented ground navigation in accordance with one or more embodiments of the invention.

FIG. 12 illustrates the logical flow for stereo camera based segmented ground navigation in accordance with one or more embodiments of the invention. This color and depth data 1202 is combined to generate into a single colored point could at 1204. The point cloud is down-sampled at 1206 using voxels to improve the performance of later algorithms. A mapping between the high-resolution points and the down-sampled points is maintained, such that high-resolution algorithms downstream are able to function correctly. The down-sampled point cloud is fed through a ground detector (to perform ground detection at 1208), which has a classical embodiment and a deep-learning based embodiment. The output of the ground detection 1208 is a set of points that are classified as ground points, and a set of points classified as non-ground points.

The ground points are fitted to a ground plane at 1210, and the colors corresponding to this plane are projected onto this plane (via ground image projection 1212), giving a "ground image". This ground image is used to tell the cart how far it is away from the sides of the aisle, on either side. This ground image is also then run through an optical flow algorithm 1214, which is able to detect the velocity of the cart between frames (i.e., the velocity estimation 1216).

The non-ground points are fed into an object detection algorithm 1218. This has a classical embodiment and a deep-learning based embodiment. The classical approach is based on clustering, finding groups of points that are nearby in 3D space, and labeling them as a single object. Each object is then flattened into a semantically segmented image mask (i.e., performing 2D object projection at 1220). This image mask is fed into a deep learning image object classifier 1222, to identify and track 1224 individual object types within the scene.

The classifier 1222 is trained on specific objects that exist commonly in orchards, including fruit bins, fruit, trees, trunks, branches, people, tractors, cars, and more. By identifying and tracking 1224 trees within the scene, the navigation system 1230 is able to match each tree to a global map of the orchard, which is used to localize the cart at 1228 and to compute another velocity estimate between frames. The detected trees are modeled based on their respective trunk centers. The cart is able to navigate 1230 by positioning itself adequately far from either trunk, both trunks, or equidistant between the two trunks. Branches are also identified by this classifier 1222, and thicker branches are avoided in order to prevent tree damage and cart damage (i.e., collision avoidance 1226). This concludes the more in-depth description of how a stereo camera could be used to navigate between rows.

Another approach that can be useful as a baseline, if other methods are struggling, is radar beacons placed strategically within the rows. A radar receiver would then be placed on the cart, and the ability to differentiate beacons would allow the cart to triangulate itself (i.e., the radar beacons within orchard rows enable localization of a cart). In this regard, Bluetooth low energy (BLE) beacons such as iBeacons may also be used in embodiments of the invention.

To determine the speed of the cart as it moves down the aisle, a rotary encoder can be used, fused with odometry sensors, an IMU and GPS to give an accurate estimate of its movement despite uneven ground.

In one or more embodiments of the invention, a picker might want to circle a tree. This would happen if the picker is working in a three dimensional orchard and wanting to pick from the whole tree. In this case, strafing would work as described, except that the cart would keep a consistent distance and speed while circling the tree. The picker could control the speed of the circling and the distance from the tree as before.

Mapping the Orchard

At the highest level of path planning, carts need to know where the rows, alleys, and yard are in an orchard, in relation to each other. If a cart is tasked with driving from the yard to a given location in a row, it needs to be able to drive down the alley to the right row, or risk having to turn around and try another one. A high-level map needs to be developed for each new orchard that will be used as the framework for the fleet management activities. It is envisioned that this will be done by driving the cart manually or remotely through the orchard with lidar, cameras and other relevant sensors attached. This collected data is then fused into a 3D or HD (high definition) map of the orchard, which can be used to navigate via autonomy or oversee the orchard.

One other way to do this is to use a phone app that keeps track of GPS locations as a person moves through an orchard (perhaps on an ATV—all terrain vehicle). That person would specify as they move if they are in a row, alley or yard. The resulting rough map will not be of high enough quality to finely control the movement of a cart in a row—that is done by the cart tree strafing system, but it will be adequate for basic path planning. In alternative embodiments, the mapping of an orchard may be performed by using an existing map, and then annotating the map with features. These features would include orchard rows, roads, "no go" zones and drop off or pick up areas.

Extensible Application Programming Interface (API)

In order to ensure that the cart is able to be used with other software products installed on the cart's computer systems, an extensible API may be used. This provides access to the telemetry of the cart, as well as information from the cart's sensors. It also allows basic control, with safety limitations in place. The data model is flexible to support communication of various information as required by the other software running on the cart's computer. It provides verbose diagnostics information in the case of an error, and clear status information about the cart. Security measures are in place to prevent external software from affecting the operation of the critical processes. External software can only control the cart through a strict API, which abstracts away low level control and provides a safe interface that prevents bad behavior. The API is designed to be middleware agnostic to suit different environments. Likely external software will be running on docker or an isolated instance on the main computer. It may even be on a separate computer. This API can also be used over a network, and doesn't have to be called on the local computer.

The key parts of the API may include:
Telemetry—user is able to request certain data types at certain intervals.
Control—user is able to send high level control commands to the cart.
Logging—user is able to log information to the carts logging infrastructure.
Mapping—user to able to query the carts mapping infrastructure.
Sensors—user is able to query certain sensor data at certain intervals.
Environment—user is able to view the carts environmental model for its own use.
State—user is able to query the state of the cart and respond to certain events.

The Fruit Tree Accessibility System

In order to allow pickers greater access to fruit, and provide an alternative to the use of ladders, embodiments of the invention may provide a fruit tree accessibility system. Four different embodiments are described herein but the invention is not intended to be limited to such embodiments.

(1) Embodiment 1: have pickers stand on top of the rear platform (engine compartment), with safety rails and a ladder to climb up to the platform. Since a typical picker's reach is 6', and the platform is 3' above the ground, such pickers could reach 9'.

(2) Embodiment 2: built upon Embodiment 1—attach some step-ups to the platform, which boost the height of the pickers additional amounts.

Figure 13:
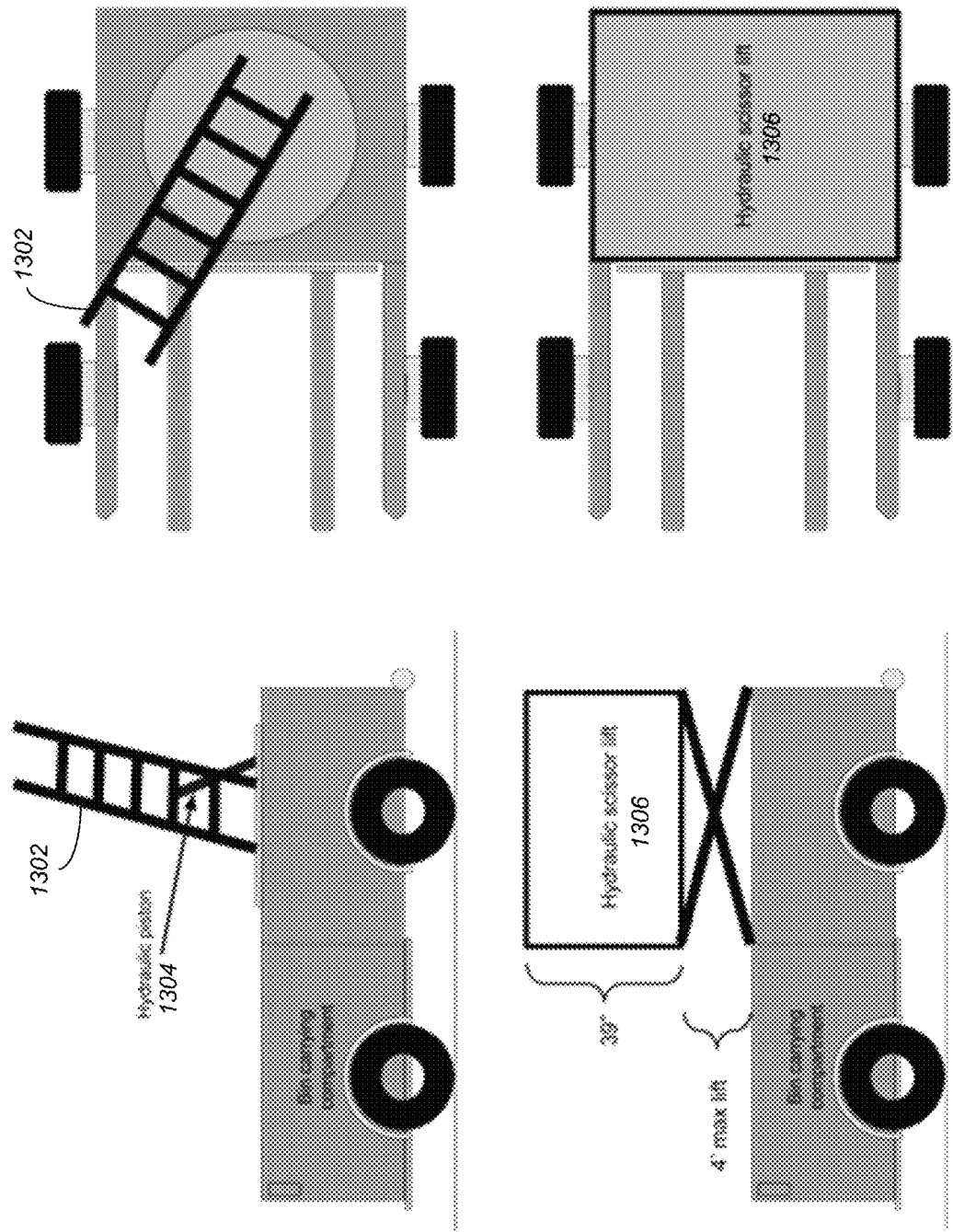
FIG. 13 illustrates two additional exemplary fruit tree accessibility systems in accordance with one or more embodiments of the invention.

FIG. 13 illustrates two additional exemplary fruit tree accessibility systems in accordance with one or more embodiments of the invention.

(3) Embodiment 3: referring to FIG. 13, affix a ladder 1302 to the top of the rear platform. It is placed on a platform which can rotate 360 degrees using an electric or hydraulic motor/piston 1304. The ladder 1302 can be extended and retracted using an electric or hydraulic actuator, and its angle adjusted as well. The most intuitive way for workers to use this ladder 1302 is to have a joystick control located on it, likely adjacent to the joystick control of the cart itself, and both joysticks shielded from inadvertent pushing by passing branches. It is also possible that a UI will allow workers to use a remote control to actuate the ladder 1302 in any direction. It could also allow them to rotate the ladder 1302 at slow speeds automatically, to follow the contour of a tree's canopy as a cart moves.

(4) Embodiment 4: referring to FIG. 13, a hydraulic scissor lift 1306 may be added to the top of the rear platform. This is commonly used in many types of heavy machinery and so will not be described further here. The platform on the scissor lift 1306 will include a railing to keep workers from falling out. The scissor lift 1306 will have similar joystick controls to the hydraulic ladder.

All accessibility systems may include safety systems to ensure workers don't fall. The main safety system will be a pole mounted on top of the cart to allow harnesses to be affixed. Thus, a picking assist method is mounted on an autonomous cart to assist a worker on the cart with the ability to pick fruit.

The Fruit Management System

Figure 14:
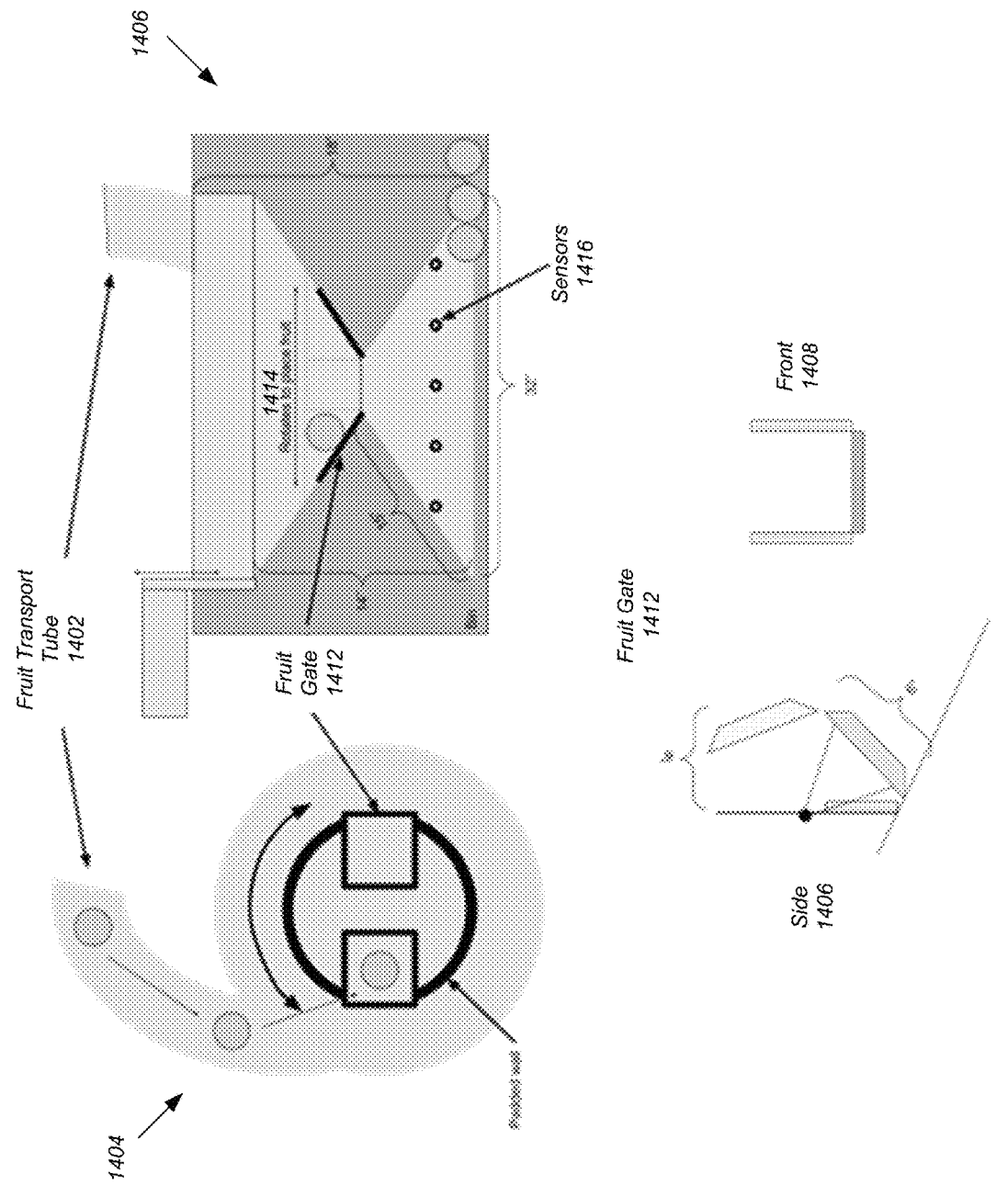
FIG. 14 details a fruit management chute system in accordance with one or more embodiments of the invention.

Fruit management may be one of the critical features of the cart, because fruit quality is incredibly important in being able to sell it at a good price. FIG. 14 details a fruit management chute system which could be used to gently place fruit in a bin, without that fruit getting bruised (and/or with minimal/minimized/reduced bruising) in accordance with one or more embodiments of the invention. A top-down view 14040 of a transport tube 1402 and system is shown in the upper left of FIG. 14, a side view 1406 of transport tube 1402 and system in shown in the upper right of FIG. 14, a side view 1406 of fruit gate design 1410 in shown in the lower left of FIG. 14, and a front view 1408 of fruit gate design 1410 in shown in the lower right of FIG. 14. This system would be lowered mechanically into a bin, when the bin is empty and sitting on the forks at the front of the cart. It would then be slowly raised by the mechanical actuator, as fruit slowly fills the bin. This can alternatively be achieved passively, by keeping the system fixed in place, and moving the bin using the forks. Fruit would be deposited to this fruit placement system via the fruit transport tube 1402, shown in FIG. 15. Fruit gates 1412 would rotate 1414 to receive fruit that is newly deposited. This system would then rotate again to locate an empty location to drop the new fruit, using the sensors 1416—likely just light or pressure sensors (i.e., sensors 1416 detect a clear area for the fruit drop). Once all the sensors 1416 have been covered the mechanical system would lift the fruit placement system, until the bin is filled.

Likely load cells may be used to determine whether a bin is full while being carried by the forklift. These will return the weight of the bin to the software system, allowing it to calculate the fill level of the bin, based on the user selected fruit.

Figure 15:
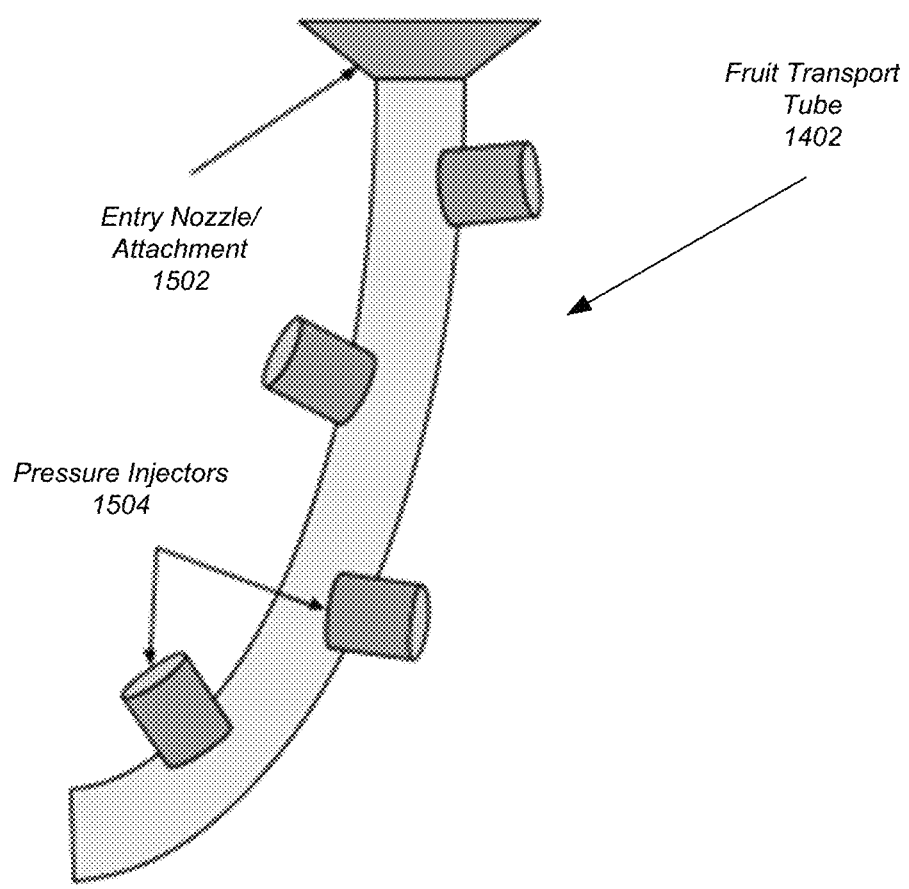
FIG. 15 shows a design for a fruit transport tube in accordance with one or more embodiments of the invention.

FIG. 15 shows a design for the fruit transport tube 1402 in accordance with one or more embodiments of the invention. At the top of the tube there is an entry nozzle 1502 or attachment that can be affixed with hooks to the top of a ladder, a picking platform, or other source of fruit. This nozzle 1502 is wide enough to allow a picker to easily load multiple fruits into the nozzle at one time. The tube itself is smooth and soft enough to not bruise the fruit as it travels through it. The tube is gravity fed, however along its length are "pressure injectors" 1504, which are small pumps blowing pressure into the tube. This acts to fight gravity and ensure no fruit gets stuck due to friction or a sharp angle. The pressure injectors 1504 may also include IMU sensors to determine whether the tube is at high enough of an angle to properly convey fruit. If the angle gets too low, the user is notified audibly, and through a push notification. The IMU is able to make this determination by detecting the direction of downward gravity relative to the angle of the pressure injector 1504. These angles are then best fit against an appropriate polynomial with several sample points; corresponding to the locations of the pressure sensors 1504 along the tube. If the polynomial has a negative slope then the user is warned. Thus, the chute uses smaller pressure injectors 1504 (i.e., compared to the use of a larger pump) to ensure fruit is moving through the tube and IMUs/accelerometers are used to detect a negative angle on the tube.

An alternative to this approach is fruit management is to employ "dumping totes". These would be filled by workers and then placed where they could be accessed by the gantry system. Normally the gantry system stacks the totes themselves, but in this case, sensors would be used to locate a place in the bin where fruit should be added to evenly fill the bin. The gantry would then move the dumping tote to that location, and cause its contents to be dumped out its bottom—perhaps by pressing on a lever on the dumping tote. The dumping tote would then be returned to a location where a worker could fill it again.

Another alternate approach is to design the forklift section of a cart to lift bins up to the level of pickers on the platform; so that they can place fruit directly. Alternatives of the cart that could support this are shown in FIGS. 2 and 5.

Cart Fleet Management

The software and hardware components for an orchard management system and fleet management system are described herein. In particular, the cart fleet management system presents an orchard field in a 3D map and allows the direction of units through that map. Key elements may include: (1) the visualization of an orchard to allow for cart control; (2) the visualization of an orchard for high level management; (3) the described data collection approaches for orchard data; and (4) the underlying methods for facilitating the cart fleet methods.

A novel "Swarm-Based Approach" methodology (as described in the co-pending patent application filed on the same date cross-referenced above) is a means of maintaining a constant flow of picking. Based on weight sensors in the forks, and the density of the fruit being picked, it can be determined when a bin in a given cart is nearing being full. This can alternatively be done using a 3D camera or otherwise to observe the current fill level within the bin. At this point, an idle cart in the yard (holding an empty bin) may be dispatched to the location of the filling cart. It waits nearby, behind the filling cart, until the workers declare that the bin is full—using the app on their smartphone, or another means. At this point, the full cart drives away, continuing down the row, and then using alleys to return to the yard. At the yard, the cart deposits the full bin, collects an empty, and waits on standby for dispatching. Meanwhile the empty cart moves forward to replace the full one, and picking continues.

This methodology requires that there be spare carts—more than there are picking teams. The time savings though, in terms of maintaining a constant flow of picking, should make up for this additional cost in most cases.

This methodology also changes the fundamental design of the software controlling the movement of the carts. Instead of tracking and controlling individual carts associated with picking teams, the teams themselves become the entity to be tracked, and the responsibility of the controlling software is to ensure that these teams are assigned carts appropriately.

To facilitate the novel "Swarm-Based Approach" methodology, certain functionality may be provided to the user of the fleet management system via a user interface. This includes monitoring of the fleet and individual carts, an ability to interact with the carts and provide high level direction, and orchard diagnostics to help the farmer make high level decisions about how best to manage their orchard.

Figure 16:
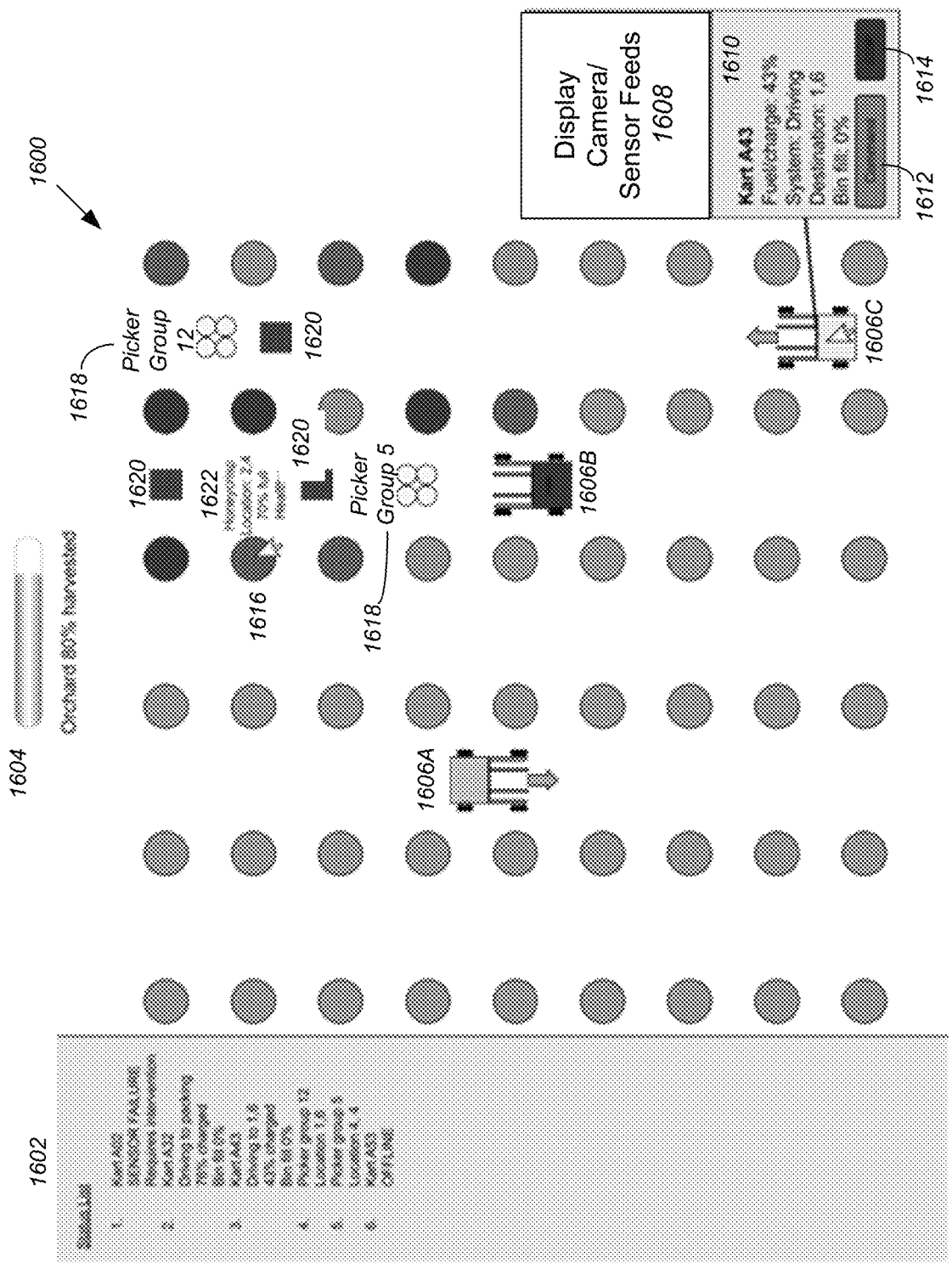
FIG. 16 illustrates an exemplary fleet management system user interface in accordance with one or more embodiments of the invention.

FIG. 16 illustrates an exemplary fleet management system user interface in accordance with one or more embodiments of the invention. The UI 1600 can be displayed on a computer or a smartphone, depending on user preference. The status list 1602 maintains a list of carts and other assets in the field. This will include groups of humans, tracked through a smartphone app, bins, drones, or whatever benefits from a continuous status update. The status bar 1604 displays overall harvest progress, this could also show progress of other orchard operations, such as pruning. Cart icons 1606 show carts (i.e., location of carts) in the field (individual cart icons 1606A-1606C are collectively referred to as carts icons 1606). The color of the cart icon 1606 may indicate its status (e.g., charged, not charged, operating normally, or in an error state). The UI 1600 shows a cart 1606B in the field with an error status (shown by an exclamation mark and differential coloring [e.g., bright red coloring]). This status is also shown in the status list 1602 (e.g., line 1 shows "Kart A02 SENSOR FAILURE Requires Intervention"). Display camera/sensor feeds 1608 shows a UI element that pops up when a user mouses over a cart 1606 (e.g., cart 1606C) in the field. This shows similar information to the status bar 1604, and it also adds a display output 1610 with sensor output to assist with diagnostics in the case of a sensor failure. The "Command" 1612 or "Stop" 1614 buttons can be used to provide high level direction to the carts, redirecting them or providing assistance in the case of autonomy or sensor failure.

It is envisioned that clicking on the "Command" button 1612 would open up an additional display to further diagnose things and effectively control the cart. In addition to other functionality, farmers would be able to place waypoints on the map using the UI and then direct the cart to go there, or follow a particular route drawn on the map. This additional display, designed to provide assistance to the cart, would also allow the user to assess errors or warnings that the cart will display. For example, this interface could be used to tell the cart to proceed when it encountered what it thought was a significant obstacle, but turned out only to be a trivial obstruction, such as a branch or grass.

In order to provide a map of the field, as shown in FIG. 16, a 2D map would be annotated to create a 3D map of the orchard with tree locations, packing and transfer hubs, and other details. Throughout the season, the yield of fruit trees would be tracked, by having carts drive the field and update the 3D map with fruit locations, using camera based object detection. This would allow for the elements shown in the display, such as circle 1616, where individual trees in the display indicate their yield with color shade. The type of fruit, location of the tree and overall healthiness of the tree is also shown in this display 1600. For example, different colored icons 1616 (e.g., green, red, purple) may reflect the type of tree, and shades of that color (e.g., from light green to dark green, and/or from light pink to dark red) may reflect yield. This allows farmers to know (e.g., upon quickly viewing the UI 1600) which trees have more or less yield and lets them plan their harvesting with pinpoint accuracy, saving money and time. Hovering over a circle 1616 may also result in additional information e.g., "Honeycrisp, Location: 2.4, 70% full, Healthy" 1622.

Picker groups 1618 and bin locations 1620 are shown in the display to allow for more accurate high level planning. A smartphone app or dedicated hardware could be used to track picker groups 1618. Bins could be kept track of by noting their last position, as deposited by a cart. Low cost hardware could also be used, as described further in the hardware section.

Logging may be a big element of the fleet management system because long term data will be incredibly important in improving the novel "Swarm-Based approach." Thus, the fleet management software will support this. Because of the unreliability of cell network reception in agriculture areas, logging data will need to be cached locally and then sent up to the cloud when network is available. Cloud based logging infrastructure will amalgamate data from carts and other infrastructure and then make it searchable based on tags.

This will allow orchard and cart performance data to be folded back into improving the overall system. Cart data will be used to allow simulation of certain corner case scenarios that caused system failure, preventing this from happening in the future. Data collected from cameras, lidar and other sensors will be fed back into machine learning models to improve their performance. Orchard data will be correlated with overall yield and other indicators of performance, allowing for improved orchard management techniques in subsequent seasons.

The hardware and software to facilitate fleet management and logging will contain several major elements. Each cart will include a cell modem (or redundant cell modems) or radio, covered in the hardware section. This will allow communication with the internet. Cloud infrastructure will house the servers and databases needed to store and retrieve data. Cloud infrastructure will also serve up the frontend interfaces needed to display data to the user and control the carts when needed. All data will be stored and centralized in the cloud to allow easy access and future diagnostics. As described above, logging and networking is sparse in agriculture environments, so data may need to be cached locally on the cart and then pushed up to the cloud when networking becomes available again. This is a common feature in many logging APIs. A RPC (remote procedure call) library may be used to transmit stateful data between the cart and the UI hosted in the cloud. This is to ensure that stateful interactions are properly transmitted over a lossy network and not dropped, leaving remote state uncertain. Sockets and UDP (user datagram protocol) may be used for streaming telemetry data, which allows for quick data transmission with some flexibility for dropped packets.

In one or more embodiments, remote diagnostic access may be provided to carts via the fleet management software. This allows easier development and testing as well as quick diagnosis of issues.

In the event that a cart requires assistance in a cell denied area it may need help from someone in the field. In this case, a worker will be notified through their phone app that a cart has gone offline, including the cart's last known location. The worker can then be directed to the area to manually resolve the problem and get the cart back online.

Embodiments of the fleet management software may also include provisions for security. Many farmers find theft of fruit to be a large problem. A solution to help with this would be an extension of the main fleet management software, e.g., including push notifications, to a farmer's phone, to let them know that the cart, on its dedicated route, has encountered an intruder. It could then transmit video data to show the farmer what the intruder looks like.

In alternative embodiments, a UI may provide diagnostic tools available to a farmer to view their orchard status while not trying to directly control the cart. This may consist of a series of high level graphs, that the farmer can click through, to see the status of their field. Attributes such as humidity, temperature, tree health, etc. may each have graphs showing their performance over the season. Farmers will also be able to view and compare different seasons to see how a particular approach affected overall performance.

Mesh Networking

Carts will be navigating together in a densely populated environment, and need to avoid humans and other carts. In order to do so, carts will together build a mesh network using their wireless modems, which allows any cart to communicate with any other cart, or workers to communicate with any other cart. Via the mesh, carts will share information about the current state of the world, including navigation plans, and the existence of humans and obstacles in the environment. If two carts fail to properly plan and approach a collision state, they can use this mesh network to negotiate a new plan where each passes the other gracefully.

An added benefit of this mesh network is that the dense trees in an orchard will wreak havoc on the wireless and GPS communications of each cart. By building a mesh network, carts that are cut off from the main network channel will be able to relay information to and from the farm management software through a chain of connected neighbors. The network also allows carts to make rough estimates of distance to each neighbor based on wireless signal strength. If a small portion of carts have a strong GPS signal, their location can serve as the anchor point for all other carts to triangulate their position. The net result will be accurate position estimation, using only spotty GPS signals, and a peer-to-peer mesh network.

Autonomous Navigation of Orchard Cart

Figure 17:
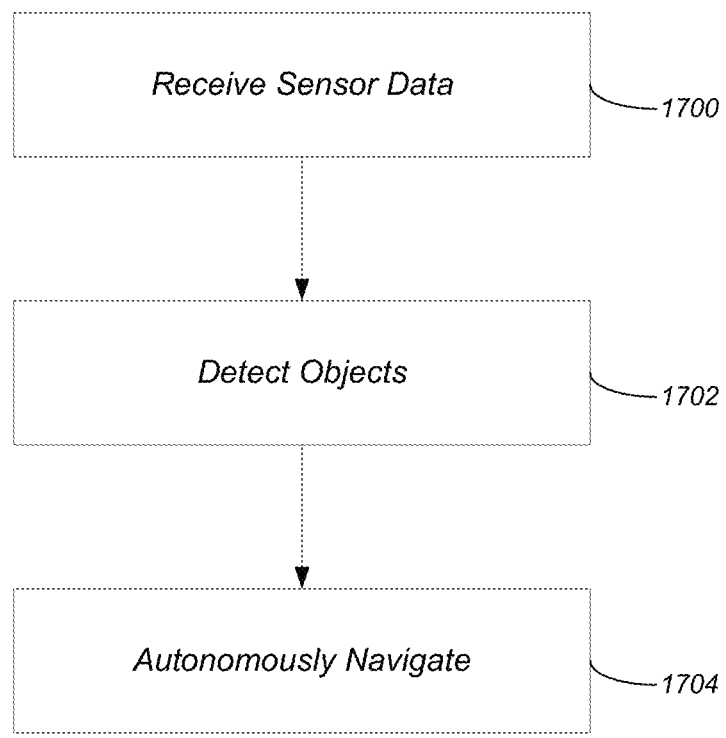
FIG. 17 illustrates the logical flow for autonomously navigating an orchard cart in an orchard in accordance with one or more embodiments of the invention.

FIG. 17 illustrates the logical flow for autonomously navigating an orchard cart in an orchard in accordance with one or more embodiments of the invention.

At step 1700, data from a sensor suite of the orchard cart (that may not have a cab for a human driver) is received into a computer. The sensor suite consists of two or more sensors including at least one positional sensor and at least one perception sensor;

At step 1702, one or more objects are detected in the orchard (i.e., via the computer and based on the data). It may be noted that a row in the orchard consists of the one or more objects.

At step 1704, the orchard cart is autonomously navigated, via the computer, through the orchard. The autonomous navigation consists of: (i) autonomously positioning, via the computer and based on the positional sensor, the orchard cart a defined distance from the detected objects with respect to the row; and (ii) autonomously maintaining a defined speed of the orchard cart as the orchard cart is navigated down the row, wherein the orchard cart avoids the detected object. In one or more embodiments, the autonomously navigation further consists of transporting the orchard cart over off-road terrain based on a powertrain of the orchard cart.

During the navigation step 1704, a detachable transport structure of the orchard cart (i.e., that is detachable from a load platform) may hold organic material from the orchard. In such embodiments, the cart may consist of a frame attached to a powertrain, where the frame provides the load platform that supports a load that exceeds five hundred (500) pounds. Further, a vertical position of the detachable transport structure may be adjusted via one or more components of the frame. In addition, the computer may compute (based on a weight measured by a scale of the orchard cart and a picker identification system), an organic material quantity for a specific picker, wherein the organic material consists of fruit. To assist in such capabilities, the orchard cart may have a camera that captures one or more images of the organic material in the detachable transport structure—such images are then used to compute a quality of the fruit in the detachable transport structure.

In one or more additional/alternative embodiments, the computer may also control the movement (via a mechanical movement system) of the detachable transport structure (such as totes) to, from, and around a storage area. The movement of the totes may include a sequence of steps including: (1) moving one or more empty totes of the one or more totes from a first location on the load platform to a second location, wherein the second location is in the storage area; (2) moving a first empty tote from the second location to a third location for filling; (3) waiting for the first empty tote to be removed and returned full of organic material thereby becoming a first full tote; (4) moving the first full tote from the second location to the first location; and (5) repeating steps (2)-(4).

In one or more embodiments of the invention, the autonomous navigation may also include a safety system for safely operating the orchard cart. Such a safety system may consist of multiple redundant layers. An emergency stop layer cuts power to the orchard cart. A software stop layer halts all operation of the orchard cart without cutting power. A safety layer constrains operations of the orchard chart based on defined safety conditions. An object detection layer uses the data from the sensor suite to avoid collision of the orchard cart with obstacles. A close proximity detection layer disallows operation of the orchard cart if humans are within touching distance of the cart. A human avoidance layer uses location information for humans in the orchard to avoid collision of the orchard cart with the humans. A boundary limitation layer avoids navigation of the orchard cart outside of a boundary of the orchard based on geofencing.

One or more embodiments of the invention may also include navigation based on human locations in the orchard. In this regard, human locations are detected in the orchard. The human locations are grouped (into one or more groups) based on distances between the human locations. The orchard cart is assigned to one of the groups. Based on the assigned group, an optimal location for the orchard cart is determined. The optimal location may consist of a minimum distance to the assigned group. The cart is then autonomously navigated to the optimal location. In one or more embodiments, there may be two or more different groups and the computer may communicate with at least one other orchard cart. In such an embodiment, the computer may coordinate with the other orchard cart to determine an optimal location for all of the orchard carts by minimizing distance from each of the orchard carts to assigned groups. Once assigned, the computer can autonomously control transportation of the orchard cart to follow the group the orchard cart is assigned (i.e., as the group moves in the orchard).

In embodiments where the locations of humans are detected/utilized, various methodologies may be used to detect such locations. In an exemplary embodiment, a smart application may record a global positioning system (GPS) location on a cellular device carried by each human. The smart application transmits the GPS location to a server application on a server executing in a cloud computing environment. A cart application executing on the computer transmits a cart location to the server application. The server application may then determine a destination for the orchard cart based on the GPS location(s) and the cart location(s). The server application transmits the destination to the orchard cart which is then transported (via the cart's computer) to that destination.

Further embodiments of the invention may monitor/utilize a cart state of the cart. For example, the computer may record telemetry data (that includes the cart's state) and transmit such telemetry data to a cloud bases server. The cloud based server may then use the telemetry data to generate a visualization of the orchard. Such a visualization may include the cart state of the orchard cart and a plant state for plants in the orchard. In addition, the visualization may be utilized to graphically move a representation of the orchard cart within the visualization to a different location within the orchard, followed by the transmission of a command that actually navigates/transports the cart to the different location.

Embodiments of the invention may also be incorporated into a mesh network consisting of a set of orchard carts. The mesh network enables communication between a server and any of the orchard carts in the set of orchard carts. Further, the mesh network may enable communication amongst the orchard carts. The mesh network may also enable signal strength based triangulation for localization of any of the orchard carts in the set of orchard carts.

Further to the above, embodiments of the invention may include a fruit management system. In such a fruit management system, sensors located under a fruit placement structure may detect a location of fruit in a fruit bin of the orchard cart. The computer then controls (based on a location of fruit in the fruit bin): (i) a fruit gate rotation; (ii) opening, and closing of the fruit gate; and (iii) a fruit management arm (where the fruit management arm moves a fruit management system within the fruit bin). In such embodiments, a fruit transport tube receives fruit, a chute is coupled to the fruit transport tube and receives the fruit from the fruit transport tube, a padded wall is positioned inside the chute to dampen an impact of the fruit received from the fruit transport tube, the fruit gate rotates around the chute and opens to allow fruit to exit the chute, and a fruit placement structure is angled and enables the fruit to travel from an opening of the fruit gate into the fruit bin.

Computer Hardware Environment

Figure 18:
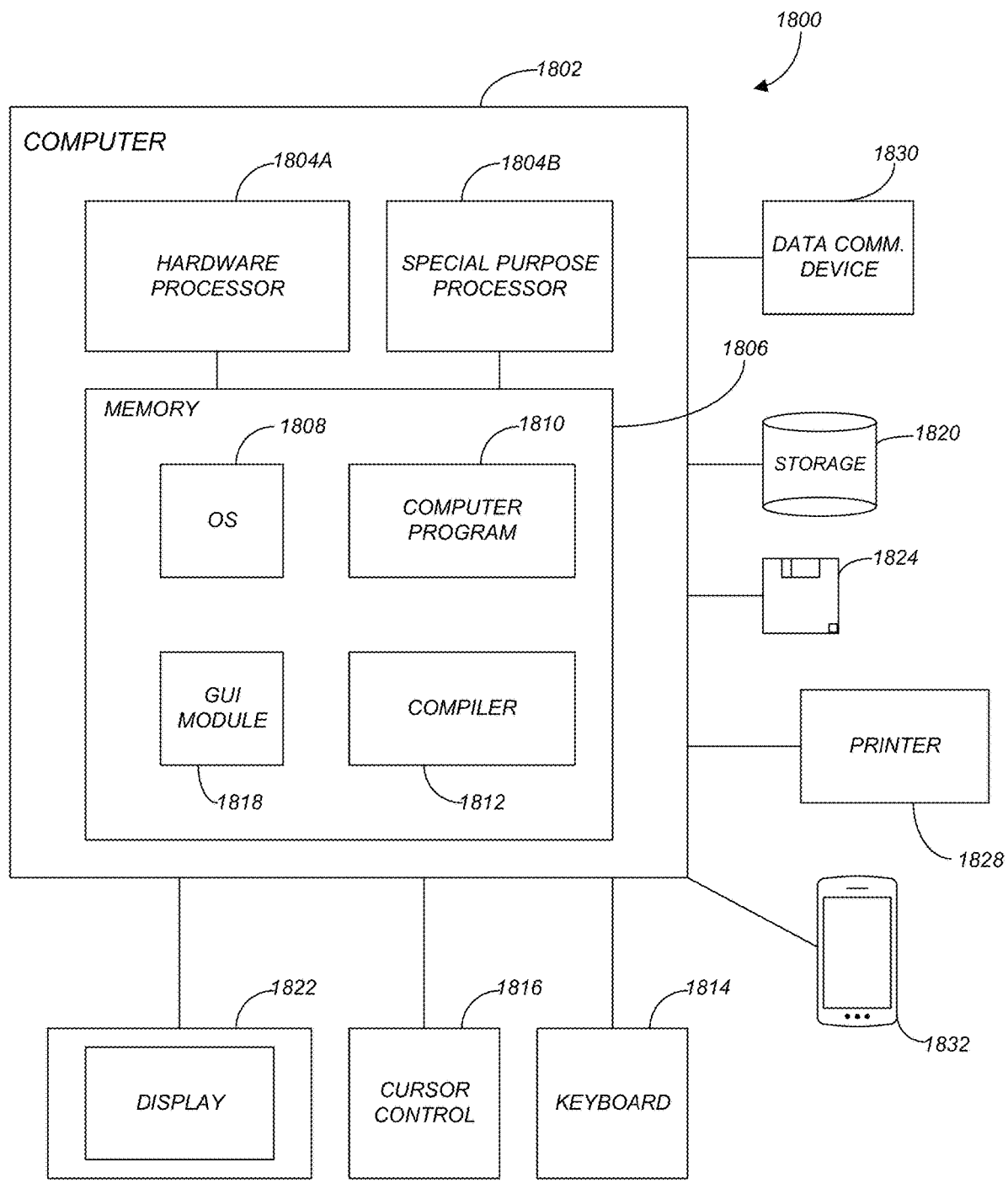
FIG. 18 is an exemplary hardware and software environment used to implement one or more embodiments of the invention.

FIG. 18 is an exemplary hardware and software environment 1800 (referred to as a computer-implemented system and/or computer-implemented method) used to implement one or more embodiments of the invention. The hardware and software environment includes a computer 1802 and may include peripherals. Computer 1802 may be a user/client computer, server computer, or may be a database computer. The computer 1802 comprises a hardware processor 1804A and/or a special purpose hardware processor 1804B (hereinafter alternatively collectively referred to as processor 1804) and a memory 1806, such as random access memory (RAM). The computer 1802 may be coupled to, and/or integrated with, other devices, including input/output (I/O) devices such as a keyboard 1814, a cursor control device 1816 (e.g., a mouse, a pointing device, pen and tablet, touch screen, multi-touch device, etc.) and a printer 1828. In one or more embodiments, computer 1802 may be coupled to, or may comprise, a portable or media viewing/listening device 1832 (e.g., an MP3 player, IPOD, NOOK, portable digital video player, cellular device, personal digital assistant, etc.). In yet another embodiment, the computer 1802 may comprise a multi-touch device, mobile phone, gaming system, internet enabled television, television set top box, or other internet enabled device executing on various platforms and operating systems.

In one embodiment, the computer 1802 operates by the hardware processor 1804A performing instructions defined by the computer program 1810 (e.g., a computer-aided design [CAD] application) under control of an operating system 1808. The computer program 1810 and/or the operating system 1808 may be stored in the memory 1806 and may interface with the user and/or other devices to accept input and commands and, based on such input and commands and the instructions defined by the computer program 1810 and operating system 1808, to provide output and results. Alternatively, the input and commands may be received electronically and may not be input via a human user (i.e., the computer 1802 may operate autonomously).

Output/results may be presented on the display 1822 or provided to another device for presentation or further processing or action. In one embodiment, the display 1822 comprises a liquid crystal display (LCD) having a plurality of separately addressable liquid crystals. Alternatively, the display 1822 may comprise a light emitting diode (LED) display having clusters of red, green and blue diodes driven together to form full-color pixels. Each liquid crystal or pixel of the display 1822 changes to an opaque or translucent state to form a part of the image on the display in response to the data or information generated by the processor 1804 from the application of the instructions of the computer program 1810 and/or operating system 1808 to the input and commands. The image may be provided through a graphical user interface (GUI) module 1818. Although the GUI module 1818 is depicted as a separate module, the instructions performing the GUI functions can be resident or distributed in the operating system 1808, the computer program 1810, or implemented with special purpose memory and processors.

In one or more embodiments, the display 1822 is integrated with/into the computer 1802 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

In alternative embodiments, the computer 1802 may not have a display 1822 as there it may not consist of any direct human interaction with the computer 1802. In such embodiments, the screen that displays information about the computer and/or vehicle/cart that the computer is integrated into may be at a remote location such as via a cloud/Internet connection (see description below for FIG. 19).

Some or all of the operations performed by the computer 1802 according to the computer program 1810 instructions may be implemented in a special purpose processor 1804B. In this embodiment, some or all of the computer program 1810 instructions may be implemented via firmware instructions stored in a read only memory (ROM), a programmable read only memory (PROM) or flash memory within the special purpose processor 1804B or in memory 1806. The special purpose processor 1804B may also be hardwired through circuit design to perform some or all of the operations to implement the present invention. Further, the special purpose processor 1804B may be a hybrid processor, which includes dedicated circuitry for performing a subset of functions, and other circuits for performing more general functions such as responding to computer program 1810 instructions. In one embodiment, the special purpose processor 1804B is an application specific integrated circuit (ASIC).

The computer 1802 may also implement a compiler 1812 that allows an application or computer program 1810 written in a programming language such as C, C++, Assembly, SQL, PYTHON, PROLOG, MATLAB, RUBY, RAILS, HASKELL, or other language to be translated into processor 1804 readable code. Alternatively, the compiler 1812 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1810 accesses and manipulates data accepted from I/O devices and stored in the memory 1806 of the computer 1802 using the relationships and logic that were generated using the compiler 1812.

The computer 1802 also optionally comprises an external communication device such as a modem, satellite link, Ethernet card, or other device for accepting input from, and providing output to, other computers 1802.

In one embodiment, instructions implementing the operating system 1808, the computer program 1810, and the compiler 1812 are tangibly embodied in a non-transitory computer-readable medium, e.g., data storage device 1820, which could include one or more fixed or removable data storage devices, such as a zip drive, floppy disc drive 1824, hard drive, CD-ROM drive, tape drive, etc. Further, the operating system 1808 and the computer program 1810 are comprised of computer program 1810 instructions which, when accessed, read and executed by the computer 1802, cause the computer 1802 to perform the steps necessary to implement and/or use the present invention or to load the program of instructions into a memory 1806, thus creating a special purpose data structure causing the computer 1802 to operate as a specially programmed computer executing the method steps described herein. Computer program 1810 and/or operating instructions may also be tangibly embodied in memory 1806 and/or data communications devices 1830, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1802.

Figure 19:
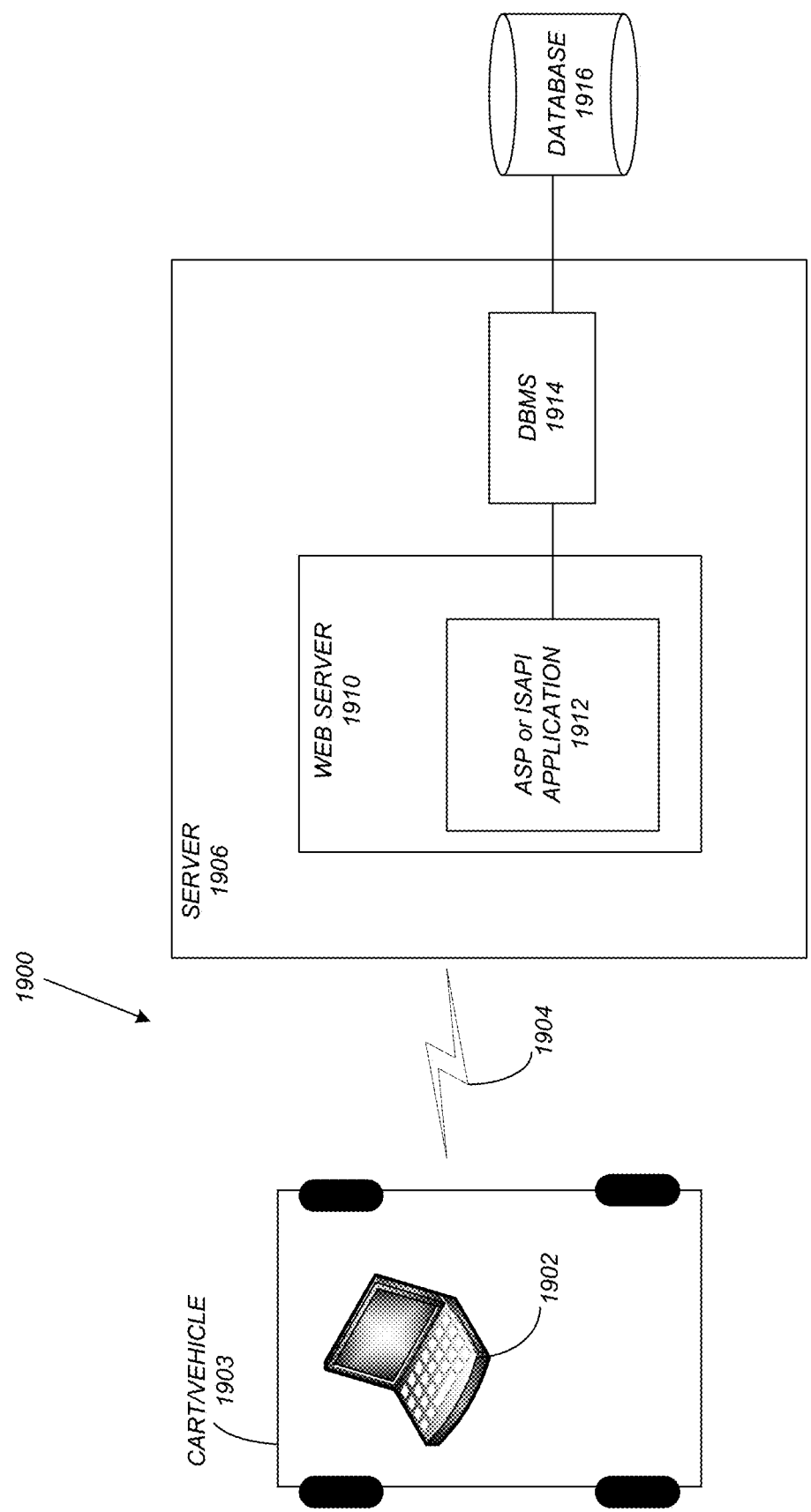
FIG. 19 schematically illustrates a typical distributed/cloud-based computer system in accordance with one or more embodiments of the invention.

FIG. 19 schematically illustrates a typical distributed/cloud-based computer system 1900 using a network 1904 to connect client computers 1902 to server computers 1906. As illustrated, client computers 1902 may be integrated into/mounted upon an orchard vehicle/cart 1903. As described above, the client computer 1902 may control the navigation of the orchard cart/vehicle 1903 throughout an orchard an may further interact with additional computers as described herein. A typical combination of resources may include a network 1904 comprising the Internet, LANs (local area networks), WANs (wide area networks), SNA (systems network architecture) networks, or the like, clients 1902 that are personal computers or workstations (as set forth in FIG. 18), and servers 1906 that are personal computers, workstations, minicomputers, or mainframes (as set forth in FIG. 18). However, it may be noted that different networks such as a cellular network (e.g., GSM [global system for mobile communications] or otherwise), a satellite based network, or any other type of network may be used to connect clients 1902 and servers 1906 in accordance with embodiments of the invention.

A network 1904 such as the Internet connects clients 1902 to server computers 1906. Network 1904 may utilize ethernet, coaxial cable, wireless communications, radio frequency (RF), etc. to connect and provide the communication between clients 1902 and servers 1906. Further, in a cloud-based computing system, resources (e.g., storage, processors, applications, memory, infrastructure, etc.) in clients

1902 and server computers 1906 may be shared by clients 1902, server computers 1906, and users across one or more networks. Resources may be shared by multiple users and can be dynamically reallocated per demand. In this regard, cloud computing may be referred to as a model for enabling access to a shared pool of configurable computing resources.

Clients 1902 may execute a client application or web browser and communicate with server computers 1906 executing web servers 1910. Such a web browser is typically a program such as MICROSOFT INTERNET EXPLORER/ EDGE, MOZILLA FIREFOX, OPERA, APPLE SAFARI, GOOGLE CHROME, etc. Further, the software executing on clients 1902 may be downloaded from server computer 1906 to client computers 1902 and installed as a plug-in or ACTIVEX control of a web browser. Accordingly, clients 1902 may utilize ACTIVEX components/component object model (COM) or distributed COM (DCOM) components to provide a user interface on a display of client 1902. The web server 1910 is typically a program such as MICROSOFT'S INTERNET INFORMATION SERVER.

Web server 1910 may host an Active Server Page (ASP) or Internet Server Application Programming Interface (ISAPI) application 1912, which may be executing scripts. The scripts invoke objects that execute business logic (referred to as business objects). The business objects then manipulate data in database 1916 through a database management system (DBMS) 1914. Alternatively, database 1916 may be part of, or connected directly to, client 1902 instead of communicating/obtaining the information from database 1916 across network 1904. When a developer encapsulates the business functionality into objects, the system may be referred to as a component object model (COM) system. Accordingly, the scripts executing on web server 1910 (and/or application 1912) invoke COM objects that implement the business logic. Further, server 1906 may utilize MICROSOFT'S TRANSACTION SERVER (MTS) to access required data stored in database 1916 via an interface such as ADO (Active Data Objects), OLE DB (Object Linking and Embedding DataBase), or ODBC (Open DataBase Connectivity).

Generally, these components 1900-1916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/ or data, when read, executed, and/or interpreted, results in the steps necessary to implement and/or use the present invention being performed.

Although the terms "user computer", "client computer", and/or "server computer" are referred to herein, it is understood that such computers 1902 and 1906 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1902 and 1906. Embodiments of the invention are implemented as a software/CAD application on a client 1902 or server computer 1906. Further, as described above, the client 1902 or server computer 1906 may comprise a thin client device or a portable device that has a multi-touch-based display.

CONCLUSION

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for autonomously navigating an orchard cart in an orchard comprising:
   (a) receiving data from a sensor suite of the orchard cart into a computer, wherein:
      (i) the sensor suite comprises two or more sensors; and
      (ii) the two or more sensors comprises at least one positional sensor and at least one perception sensor;
   (b) detecting, via the computer and based on the data, one or more objects in the orchard, wherein a row in the orchard comprises the one or more objects;
   (c) autonomously navigating, via the computer, the orchard cart through the orchard, wherein the autonomously navigating comprises:
      (i) autonomously positioning, via the computer and based on the positional sensor, the orchard cart a defined distance from the detected objects with respect to the row; and
      (ii) autonomously maintaining a defined speed of the orchard cart as the orchard cart is navigated down the row, wherein the orchard cart avoids the detected object; and
   (d) transporting, during the navigating, a load in multiple detachable transport structures of the orchard cart, wherein:
      (i) the orchard cart comprises a frame attached to a powertrain;
      (ii) the frame includes a load platform that supports the load; and
      (iii) the multiple detachable transport structures are detachable from the load platform.

2. The method of claim 1, wherein the autonomously navigating further comprises:
   transporting the orchard cart over off-road terrain based on the powertrain of the orchard cart.

3. The method of claim 1, wherein the orchard cart does not have a cab for a human driver.

4. The method of claim 1, further comprising:
   holding, in at least one of the multiple detachable transport structures of the orchard cart, organic material from the orchard.

5. The method of claim 4, wherein:
   the load exceeds five hundred (500) pounds.

6. The method of claim 4, further comprising:
   adjusting a vertical position of at least one of the multiple detachable transport structures, via one or more components of the frame of the orchard cart.

7. The method of claim 4, further comprising:
   computing, based on a weight measured by a scale of the orchard cart and a picker identification system, an organic material quantity for a specific picker, wherein the organic material comprises fruit.

8. The method of claim 7, further comprising:
- capturing, via a camera of the orchard cart, one or more images of the organic material in the multiple detachable transport structures; and
- computing, via the computer, based on the one or more images, a quality of the fruit in the multiple detachable transport structures.

9. The method of claim 4, further comprising:
- moving, via a mechanical movement system that is controlled by the computer, one or more totes to, from, and around a storage area, wherein the multiple detachable transport structures comprise the one or more totes.

10. The method of claim 9, wherein the moving the one or more totes further comprises:
   (1) moving one or more empty totes of the one or more totes from a first location on the load platform to a second location, wherein the second location is in the storage area;
   (2) moving a first empty tote from the second location to a third location for filling;
   (3) waiting for the first empty tote to be removed and returned full of organic material thereby becoming a first full tote;
   (4) moving the first full tote from the second location to the first location; and
   (5) repeating steps (2)-(4).

11. The method of claim 1, further comprising safely operating the orchard cart via a safety system, wherein the safety system comprises multiple redundant layers, wherein the multiple redundant layers comprise:
- an emergency stop layer that cuts power to the orchard cart;
- a software stop layer that halts all operation of the orchard cart without cutting power;
- a safety layer that constrains operations of the orchard chart based on defined safety conditions;
- an object detection layer that uses the data from the sensor suite to avoid collision of the orchard cart with obstacles;
- a close proximity detection layer that disallows operation of the orchard cart if humans are within touching distance of the cart;
- a human avoidance layer that uses location information for humans in the orchard to avoid collision of the orchard cart with the humans; and
- a boundary limitation layer that avoids navigation of the orchard cart outside of a boundary of the orchard based on geofencing.

12. The method of claim 1, wherein the autonomously navigating further comprises:
- detecting human locations in the orchard;
- grouping the human locations into one or more groups based on distances between the human locations;
- assigning the orchard cart to one of the one or more groups;
- determining, based on the assigning, an optimal location for the orchard cart, wherein the optimal location comprises a minimum distance to the assigned group; and
- autonomously navigating the orchard cart to the optimal location.

13. The method of claim 12, further comprising:
- the computer communicating with at least one other orchard cart, wherein the grouping is into two or more groups; and
- the computer coordinating with the at least one other orchard cart to determine an optimal location for all of the orchard carts by minimizing distance from each of the orchard carts to assigned groups.

14. The method of claim 12, further comprising:
- the computer autonomously controlling transportation of the orchard cart to follow the group the orchard cart is assigned to as the group moves in the orchard.

15. The method of claim 12, wherein the detecting human locations comprises:
- recording, in a smart application, a global positioning system (GPS) location on a cellular device carried by each human;
- the smart application transmitting the GPS location to a server application on a server executing in a cloud computing environment;
- a cart application executing on the computer on the orchard cart transmitting a cart location to the server application;
- the server application determining a destination for the orchard cart based on the GPS location and the cart location;
- the server application transmitting the destination to the orchard cart; and
- the computer controlling transportation of the orchard cart based on the destination.

16. The method of claim 1, further comprising:
- the computer on the orchard cart:
   - recording telemetry data, wherein the telemetry data comprises a cart state of the orchard cart; and
   - transmitting the telemetry data to a cloud based server; and
- the cloud based server:
   - receiving the telemetry data; and
   - generating a visualization of the orchard, wherein the visualization comprises the cart state of the orchard cart and a plant state for plants in the orchard.

17. The method of claim 16, further comprising:
- utilizing the visualization to graphically move a representation of the orchard cart within the visualization to a different location within the orchard; and
- based on the move, transmitting a command to the computer that navigates the orchard cart to the different location.

18. The method of claim 1, further comprising:
- the computer communicating with a mesh network comprised of a set of orchard carts, wherein:
   - the mesh network enables communication between a server and any of the orchard carts in the set of orchard carts; and
   - the mesh network enables communication amongst the orchard carts in the set of orchard carts.

19. The method of claim 1, further comprising:
- the computer communicating with a mesh network comprised of a set of orchard carts, wherein the mesh network enables signal strength based triangulation for localization of any of the orchard carts in the set of orchard carts.

20. The method of claim 1, further comprising:
- detecting, via one or more of the two or more sensors, a location of fruit in a fruit bin of the orchard cart, wherein the one or more of the two or more sensors are located under a fruit placement structure;

the computer controlling, based on a location of fruit in a fruit bin of the orchard cart:
a fruit gate rotation;
opening, and closing of the fruit gate; and
a fruit management arm, wherein the fruit management arm moves a fruit management system within the fruit bin; and wherein:
a fruit transport tube receives fruit;
a chute is coupled to the fruit transport tube and receives the fruit from the fruit transport tube;
a padded wall is positioned inside the chute to dampen an impact of the fruit received from the fruit transport tube;
the fruit gate rotates around the chute and opens to allow fruit to exit the chute; and
a fruit placement structure is angled and enables the fruit to travel from an opening of the fruit gate into the fruit bin.

* * * * *